US008108785B2

(12) United States Patent
Matthews et al.

(10) Patent No.: US 8,108,785 B2
(45) Date of Patent: Jan. 31, 2012

(54) SUPPORTING USER MULTI-TASKING WITH CLIPPING LISTS

(75) Inventors: Tara L Matthews, Pittsburgh, PA (US); George G Robertson, Seattle, WA (US); Mary P Czerwinski, Woodinville, WA (US); Desney S Tan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 11/328,005

(22) Filed: Jan. 9, 2006

(65) Prior Publication Data

US 2007/0162866 A1     Jul. 12, 2007

(51) Int. Cl.
*G06F 3/048* (2006.01)
(52) U.S. Cl. ......... 715/764; 715/230; 715/770; 715/783
(58) Field of Classification Search .................. 715/769, 715/788, 772, 840, 230–233, 243, 252–253, 715/764–766, 770, 779, 781–783, 792, 798–801, 715/821, 835, 837–838, 861, 866
See application file for complete search history.

(56) References Cited

U.S. PATENT DOCUMENTS

| | | | | |
|---|---|---|---|---|
| 5,142,619 A | * | 8/1992 | Webster, III | 715/803 |
| 5,237,648 A | * | 8/1993 | Mills et al. | 715/723 |
| 5,628,500 A | * | 5/1997 | Iguchi | 269/37 |
| 5,764,215 A | * | 6/1998 | Brown et al. | 345/620 |
| 5,920,313 A | * | 7/1999 | Diedrichsen et al. | 715/767 |
| 5,986,669 A | * | 11/1999 | Kirkland | 345/620 |
| 6,366,923 B1 | * | 4/2002 | Lenk et al. | 707/104.1 |
| 6,694,379 B1 | * | 2/2004 | Hanko et al. | 719/329 |
| 6,864,899 B1 | * | 3/2005 | Barrus et al. | 345/620 |
| 6,957,395 B1 | * | 10/2005 | Jobs et al. | 715/765 |
| 7,287,233 B2 | * | 10/2007 | Arend et al. | 715/795 |
| 7,346,855 B2 | * | 3/2008 | Hellyar et al. | 715/783 |
| 7,434,177 B1 | * | 10/2008 | Ording et al. | 715/862 |
| 7,519,573 B2 | * | 4/2009 | Helfman et al. | 707/1 |
| 7,523,414 B2 | * | 4/2009 | Schmidt et al. | 715/798 |
| 7,581,192 B2 | * | 8/2009 | Stabb et al. | 715/781 |

(Continued)

OTHER PUBLICATIONS

U.S. Appl. No. 10/851,928, May 21, 2004, Meyers et al.

*Primary Examiner* — Weilun Lo
*Assistant Examiner* — Enrique Iturralde
(74) *Attorney, Agent, or Firm* — Lee & Hayes, PLLC

(57) ABSTRACT

A method for managing windows in a display is disclosed. The method comprises forming clippings for windows located in a focal region of a display; displaying the clippings in a peripheral region of the display; hiding the windows in the focal region of the display; indicating the states of the clippings; and in response to a user action, displaying the windows and hiding the clippings. A clipping comprises an image of a region of a window and an icon. A clipping is formed when a window is dragged from the focal region into the peripheral region or when the minimize button of a window is clicked. A clipping list is formed when a clipping is moved near another clipping. A clipping moved near a clipping list is inserted into the clipping list. Indicating the change state of a clipping comprises detecting that the contents of the clipping are changing; providing a visual cue for the clipping; changing the appearance of the visual cue in response to detecting that the contents of the clipping are no longer changing; and removing the visual cue in response to a user action. The change state of a clipping in a clipping list is propagated to the clipping list.

1 Claim, 23 Drawing Sheets

U.S. PATENT DOCUMENTS

| | | |
|---|---|---|
| 2004/0165010 A1 | 8/2004 | Robertson et al. |
| 2005/0088452 A1* | 4/2005 | Hanggie et al. ............... 345/581 |
| 2005/0195217 A1* | 9/2005 | Robertson et al. ............ 345/619 |
| 2006/0075353 A1* | 4/2006 | DeSpain et al. .............. 715/770 |
| 2006/0224989 A1* | 10/2006 | Pettiross et al. ............. 715/779 |
| 2006/0230156 A1* | 10/2006 | Shappir et al. ............... 709/227 |
| 2006/0248471 A1* | 11/2006 | Lindsay et al. ............... 715/800 |
| 2006/0274086 A1* | 12/2006 | Forstall et al. ................ 345/629 |
| 2006/0277481 A1* | 12/2006 | Forstall et al. ................ 715/764 |
| 2007/0016873 A1* | 1/2007 | Lindsay ....................... 715/781 |
| 2007/0033544 A1* | 2/2007 | Fleisher et al. ............... 715/800 |
| 2007/0106952 A1* | 5/2007 | Matas et al. .................. 715/764 |

* cited by examiner

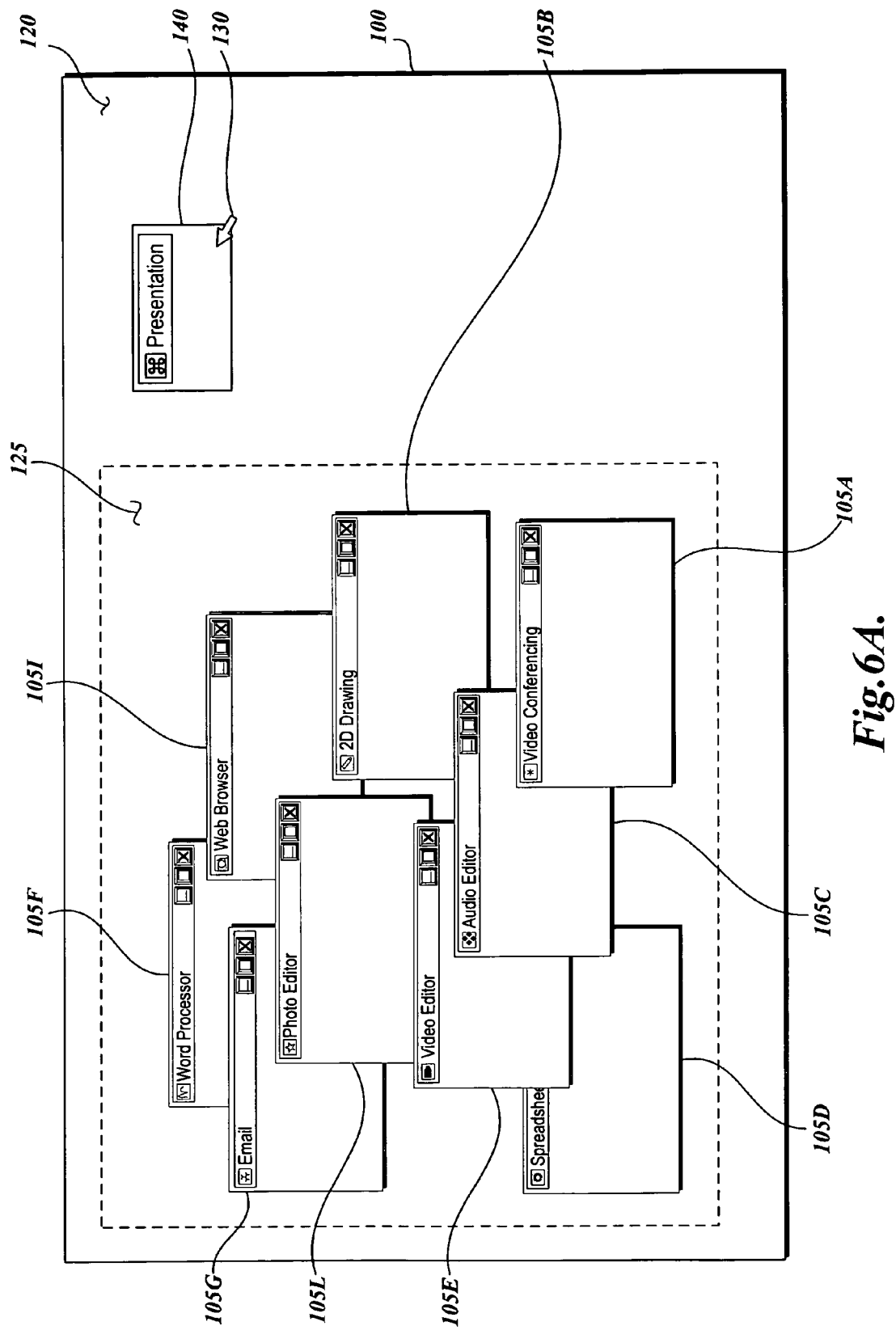

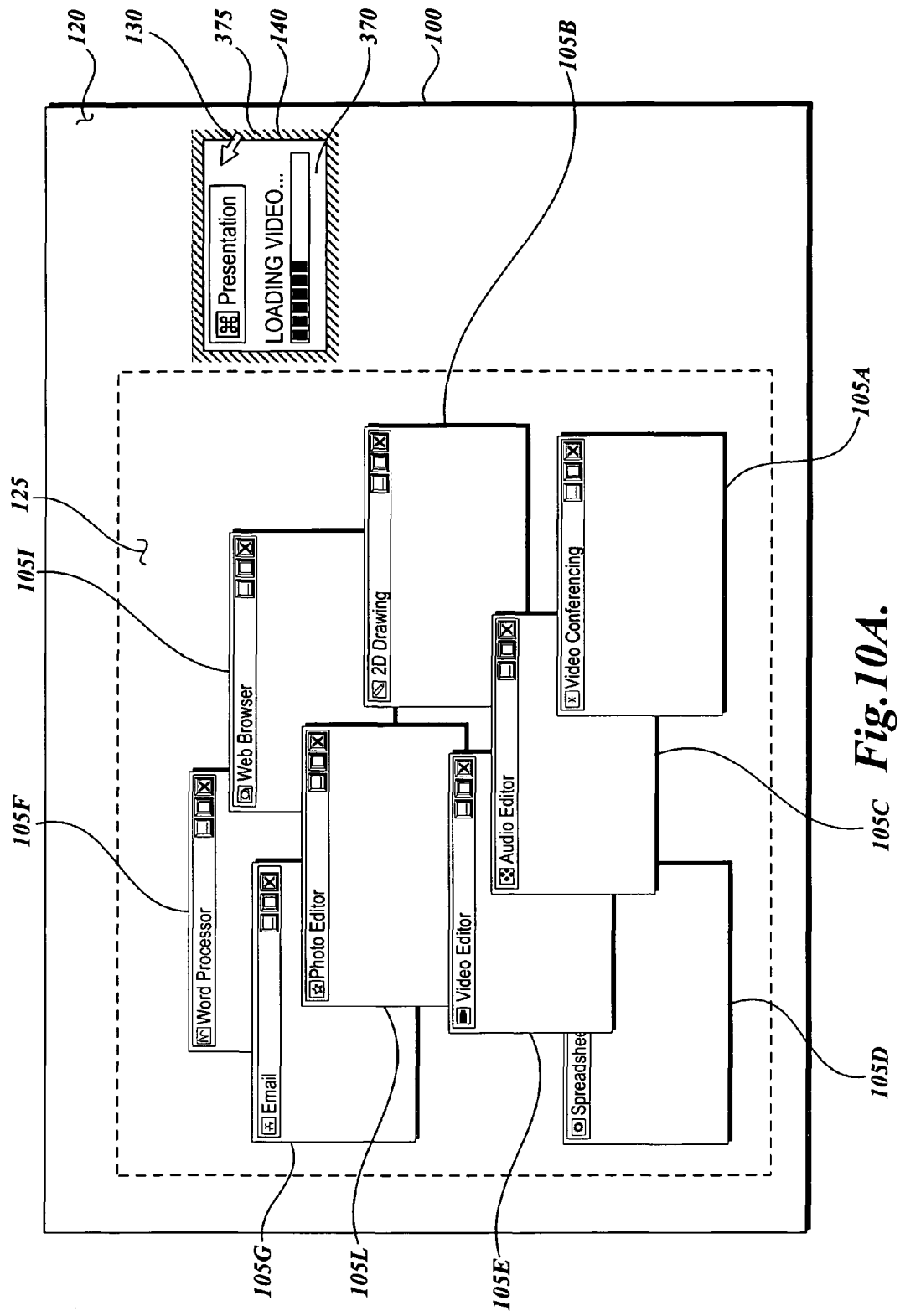

SUPPORTING USER MULTI-TASKING WITH CLIPPING LISTS

BACKGROUND

Users often interact with computing devices via graphical user interfaces. A graphical user interface (GUI) is a computer software program, usually executed within an operating system that enables users to view and manipulate visual elements that represent software objects. Certain software objects may also be associated with hardware objects, such as disc drives, printers, servers, switches, other peripheral devices, other computing devices, and the like. Visual elements of a GUI are viewed on a display surface. A display surface may comprise the electronic display of a computing device, e.g., a desktop computer, laptop computer, personal digital assistant (PDA), cellular telephone, interactive kiosk, etc. A display surface may also comprise multiple physical display devices such as, but not limited to, an array of liquid crystal displays (LCDs). A display surface may also be referred to as a "screen" or "desktop." A display surface may be subdivided into multiple viewing areas often referred to as "displays." A display surface on which a GUI presents visual elements for viewing is generically referred to herein as a "display." Visual elements presented by a GUI on a display are manipulated by actions such as moving and clicking a computer mouse, typing on a keyboard, pressing buttons on a keypad, etc.

In a GUI, visual elements may be placed inside of a "window." A window is a bounded region of a display that is dedicated to presenting particular software objects and/or providing a particular set of functions, i.e., actions. For example, an e-mail program provides a window in which to view e-mail messages represented by visual elements. The e-mail program usually provides functions, i.e., actions, such as, but not limited to, creating, editing, and organizing e-mail messages. Windows are usually rectangular but may be any two-dimensional shape.

GUIs enable users to perform a wide variety of tasks. Typically, the wide variety and large number of tasks users perform in a GUI require users to coordinate and operate on information from multiple sources. Each source of information is typically contained within a window, the fundamental unit at which users can easily manipulate information. While performing a particular task, a user often benefits from simultaneously viewing relevant information that exists within different windows. Finding and viewing the windows for a particular task is difficult when a GUI contains windows for a plurality of tasks.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for managing windows in a display is disclosed. The method comprises: forming clippings for windows located in a focal region of a display; displaying the clippings in a peripheral region of the display; hiding the windows in the focal region of the display; indicating the states of the clippings; and in response to a user action, displaying the windows and hiding the clippings.

A clipping comprises an image of a region of a window and an icon. The default image of a region of a window contains the title of the window. The image of a region of a window may also be selected by dragging a cursor across the region of the window.

A clipping is formed when a window is dragged from the focal region into the peripheral region. A clipping may also be formed when the minimize button of a window is clicked.

A clipping list is formed when a clipping is moved near another clipping. A clipping moved near a clipping list is inserted into the clipping list.

Indicating the change state of a clipping comprises: detecting that the contents of the clipping are changing; providing a visual cue for the clipping; changing the appearance of the visual cue in response to detecting that the contents of the clipping are no longer changing; and removing the visual cue in response to a user action. The contents of the clipping are updated in accordance with the changing contents of the window associated with the clipping. Differences between the window contents and the clipping contents are detected and the clipping contents are replaced with the changed window contents.

Differences between the contents of the window and the contents of the clipping are detected by periodically comparing the window contents to the clipping contents. Pixels in selected positions in the window contents are compared to pixels in the same positions in the clipping contents. Alternatively, the window may inform the clipping that the window's content has changed and that the clipping content should change.

The change state of a clipping in a clipping list is propagated to the clipping list.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6A is an illustration of an exemplary display with an exemplary peripheral region containing an exemplary clipping and an exemplary focal region containing a plurality of exemplary windows;

FIG. 10A is an illustration of an exemplary display with an exemplary clipping, in a peripheral region, that contains changing content and is surrounded by a "red" border;

DETAILED DESCRIPTION

A window is a bounded region of a display, in a GUI, that is dedicated to presenting objects and/or providing a particular set of functions, i.e., actions. While GUIs enable users to perform a wide variety of tasks, when a display of a GUI contains windows for a plurality of tasks, it is often difficult for users to find and view the windows for a particular task. A way to manage windows for a plurality of tasks in a display is to represent windows with images smaller than the windows and place the smaller images off to a side of the display.

Visual elements, e.g., windows and images, may be moved in a display by "dragging." Dragging is performed by pressing a mouse button or key and holding down the mouse button or key while moving the mouse, causing the cursor and the visual element the cursor is over to move. In both clicking and dragging, the button or key is usually a part of the pointing device, e.g., a mouse button, but may be a part of another device, e.g., a key on a keyboard. A variant of dragging, often referred to as "select dragging," may be used to select a plurality of visual elements in an area of the display or to select an area of the display. To begin select dragging, the cursor is placed over an empty area of the display outside of the plurality of visual elements to be selected or at a corner of the display area to be selected. The mouse button is held down and the cursor is "dragged" diagonally across the area containing the plurality of visual elements. Preferably, a rectangle with a dashed line border is used to indicate a rectangular region being selected as the cursor is dragged. The cursor is dragged until the rectangle surrounds the plurality of visual elements or the desired display area. When the desired visual elements are surrounded by the rectangle, or desired display area is outlined by the rectangle, the mouse button is released selecting the visual elements or display area.

Figure 1:
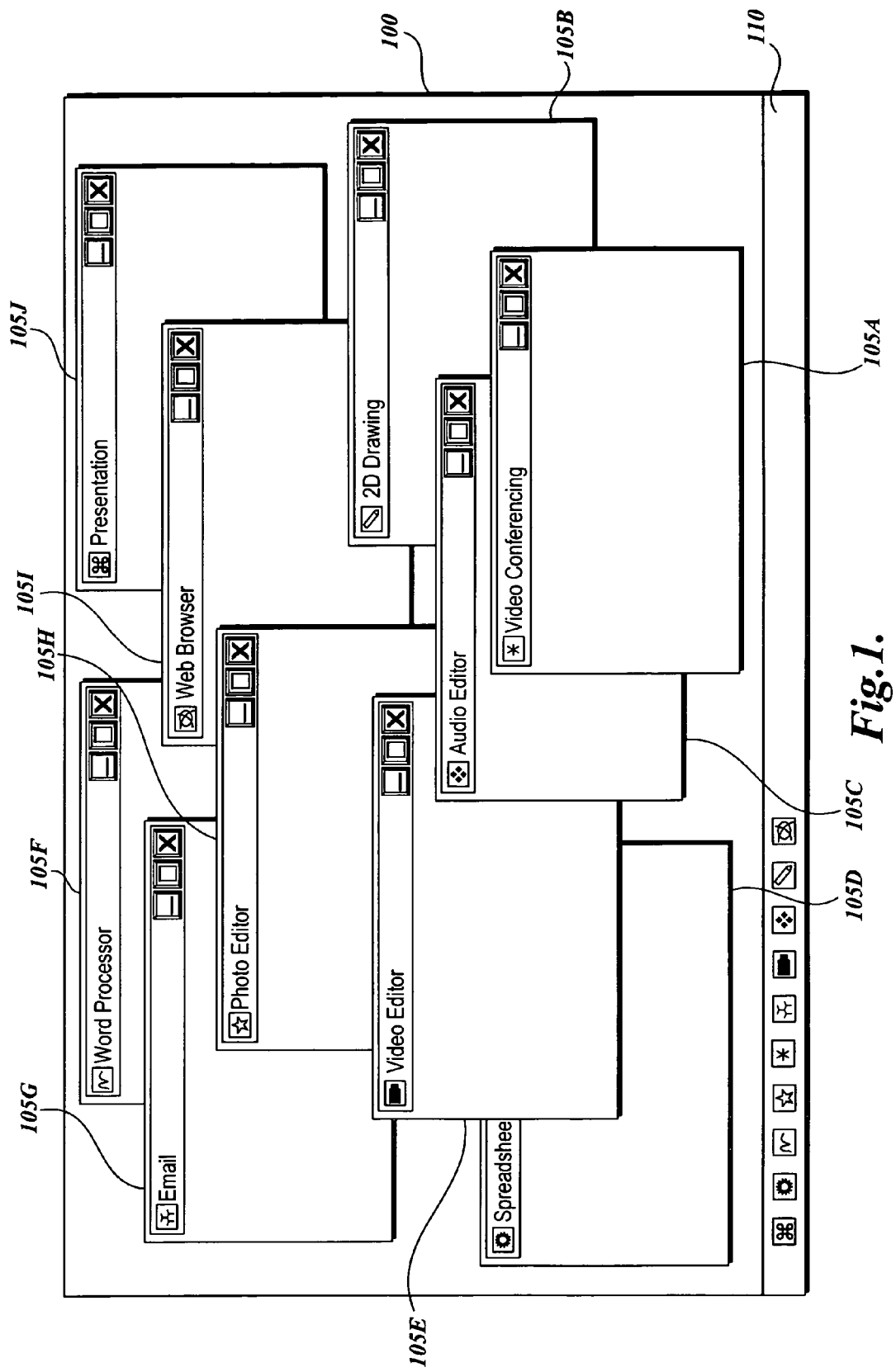
FIG. 1 is an illustration of an exemplary display with an exemplary task bar and a plurality of exemplary windows.

FIG. 1 illustrates an exemplary display 100 containing an exemplary plurality of exemplary windows 105A, 105B, 105C, 105D, 105E, 105F, 105G, 105H, 105I, and 105J, and a task bar 110. The windows in the plurality of windows 105A, 105B, etc. overlap and in certain cases partially obscure the window titles. Each window in the plurality of windows 105A, 105B, etc. is associated with an application, i.e., a software program designed for a particular purpose, e.g., word processing, email, etc. The upper left corner of each window contains an icon, i.e., a small symbolic image, that indicates the application with which the window is associated. Using icons to indicate the applications with which windows are associated may or may not be implemented in a GUI. Hence, using icons to indicate the applications with which windows are associated should be construed as exemplary and not limiting. For ease of reference herein, the title bars of the exemplary windows contain titles that indicate the applications with which the exemplary windows are associated. In general, window titles need not indicate the applications with which the exemplary windows are associated. Hence, window titles indicating applications should be construed as exemplary and not limiting. The titles of the exemplary windows in the exemplary plurality of windows 105A, 105B, etc., are: Video Conferencing 105A, 2D Drawing 105B, Audio Editor 105C, Spreadsheet 105D, Video Editor 105E, Word Processor 105F, Email 105G, Photo Editor 105H, Web Browser 105I, and Presentation 105J. A window may be selected and moved forward in relation to other windows in the plurality of windows 105A, 105B, etc., by clicking on the window. A window can be repositioned by dragging. The task bar 110 contains icons. Each icon in the task bar 110 represents, and is associated with, a window in the plurality of windows 105A, 105B, etc. A window may be selected by selecting the icon associated with the window. Selecting windows by selecting the icons with which windows are associated may or may not be implemented in a GUI. Hence, selecting windows by selecting the icons with which windows are associated should be construed as exemplary and not limiting.

Figure 2A:
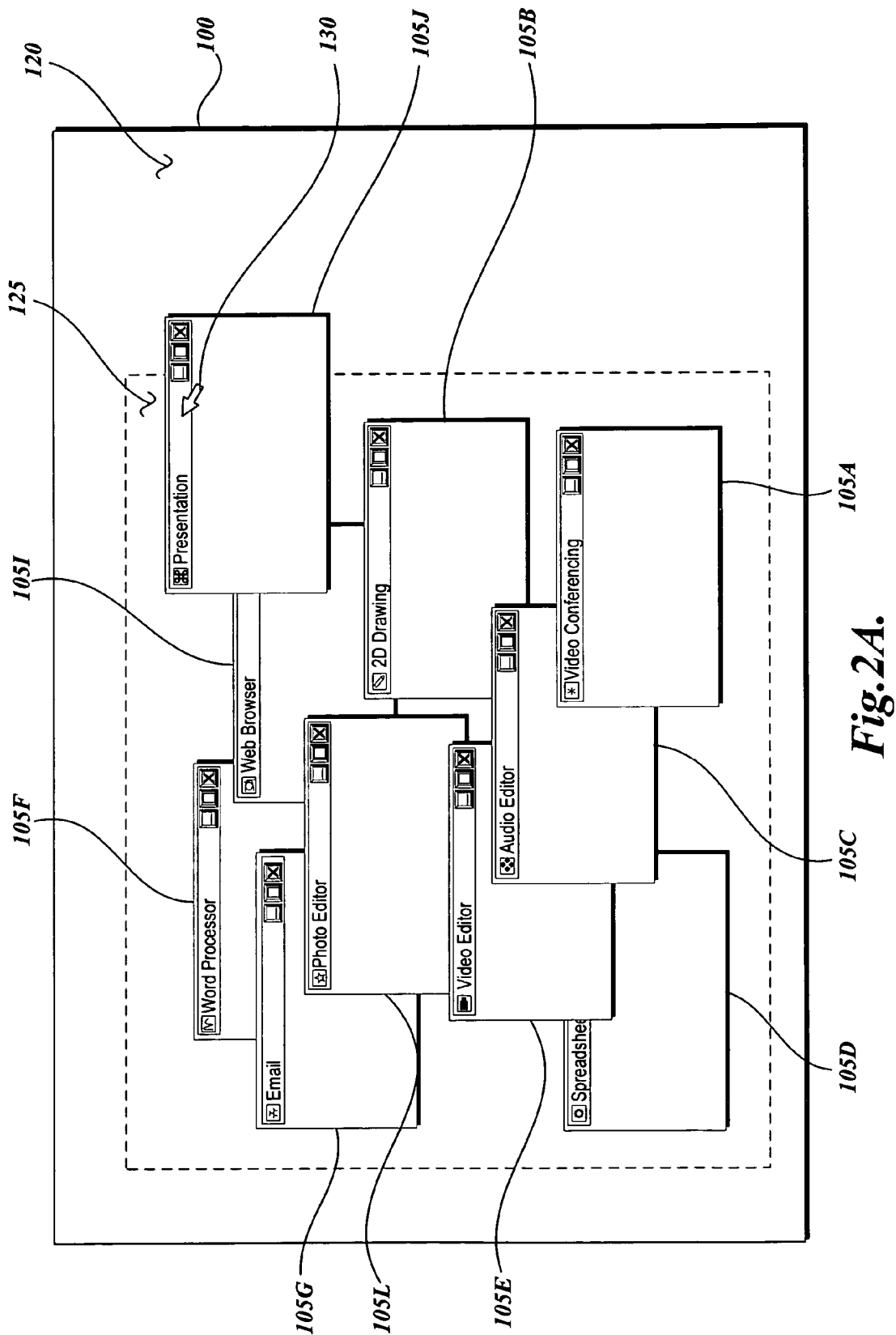
FIG. 2A is an illustration of an exemplary display with exemplary focal and peripheral regions, and a plurality of exemplary windows with a window overlapping the focal and peripheral regions.
Figure 2B:
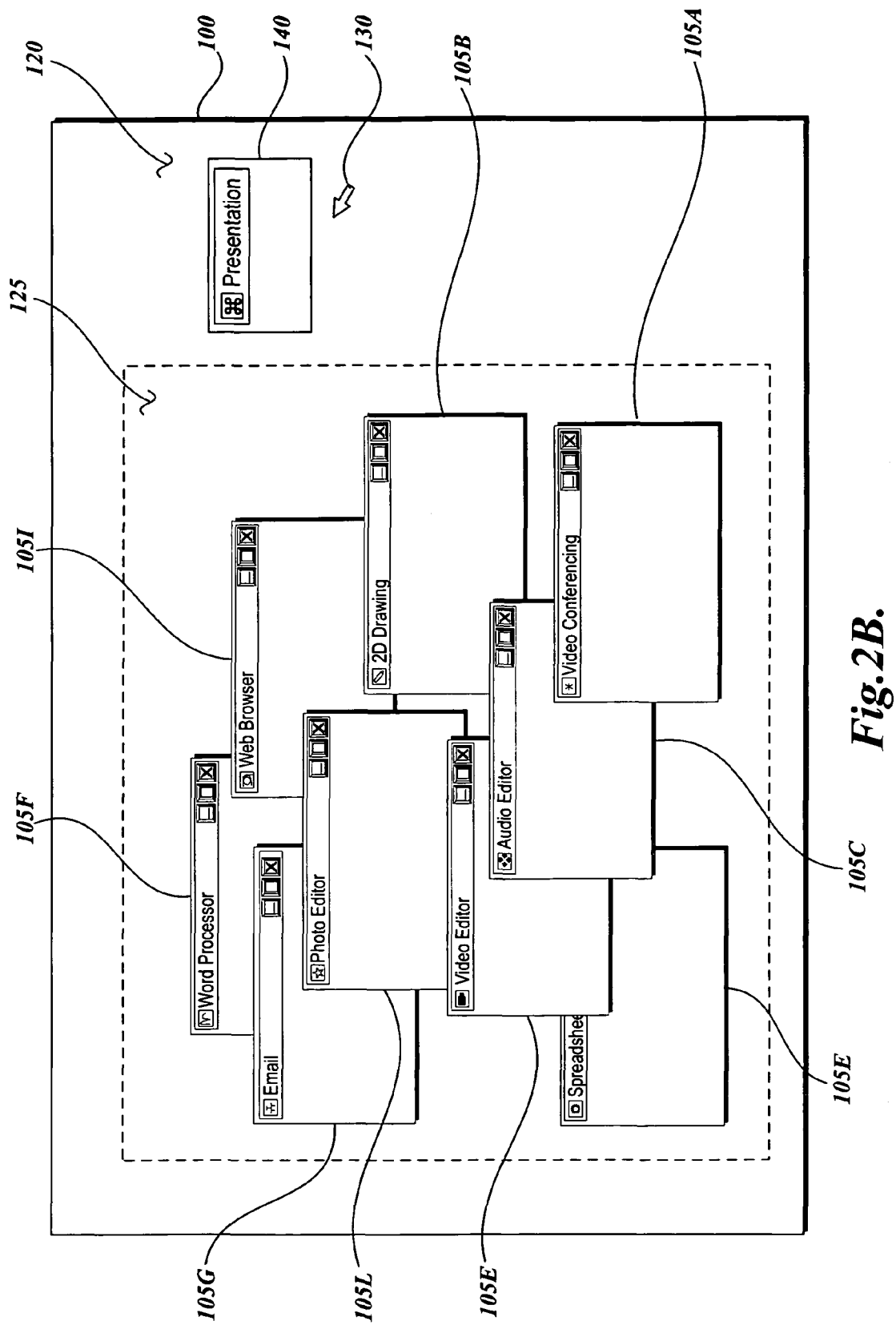
FIG. 2B is an illustration of the exemplary display shown in FIG. 2A with the overlapping window hidden and an exemplary clipping for the overlapping window shown in the peripheral region.

A task bar containing icons is a way to manage windows for a plurality of tasks by representing the windows with images smaller than the windows. A more effective way to manage windows is to use "clippings." A clipping comprises an image and an icon. The image in a clipping is a region of a window with which the clipping is associated. The icon represents the application with which the window is associated. Clippings "distill" the information contained in a window to make it easier for users to quickly understand the status of the window and the task for which the window was created. FIGS. 2A and 2B show the formation of an exemplary clipping.

FIG. 2A is an illustration of the exemplary display 100 also shown in FIG. 1. In FIG. 2A, instead of containing a task bar 110, the exemplary display 100 is divided into a peripheral region 120 and a focal region 125. The border between the peripheral region 120 and focal region 125 is indicated by a dashed line. The dashed line border between the peripheral region 120 and focal region 125 is for illustration purposes only and is not visible in an actual display. The focal region 125 contains the plurality of windows 105A, 105B, etc. also shown in FIG. 1. In FIG. 2A, the Presentation application window 105J is dragged within the focal region 125 so that the Presentation application window (i.e., the Presentation window 105J, overlaps both the focal region 125 and the peripheral region 120. The Presentation window 105J is dragged between the focal region 125 and peripheral region 120 by moving the cursor 130 over the title bar of the Presentation window 105J; pressing and holding down a mouse button; and moving the cursor 130 toward the peripheral region 120 causing the Presentation window 105J to be dragged toward the peripheral region 120.

FIG. 2B illustrates the results of dragging the Presentation window 105J into the peripheral region 120. In FIG. 2B, display 100 has the peripheral region 120 and focal region 125. The cursor 130 is located in the peripheral region 120. The focal region 125 contains the plurality of windows 105A, 105B, etc., except for the Presentation window 105J. That is, the plurality of windows 105A, 105B, etc., no longer includes the Presentation window 105J. The Presentation window 105J is hidden and a "clipping," i.e., Presentation clipping, 140 is displayed in the peripheral region 120 to represent the Presentation window 105J. A clipping comprises an image and an icon. An exemplary Presentation clipping 140 illustrated in FIG. 4A, comprises an unchanging image 360, which includes a title bar 355, and an icon 350. The image in a clipping is a region of the window with which the clipping is associated. For example, unchanging image 360 in Presentation clipping 140 is derived from the Presentation window 105J.

Figure 3A:
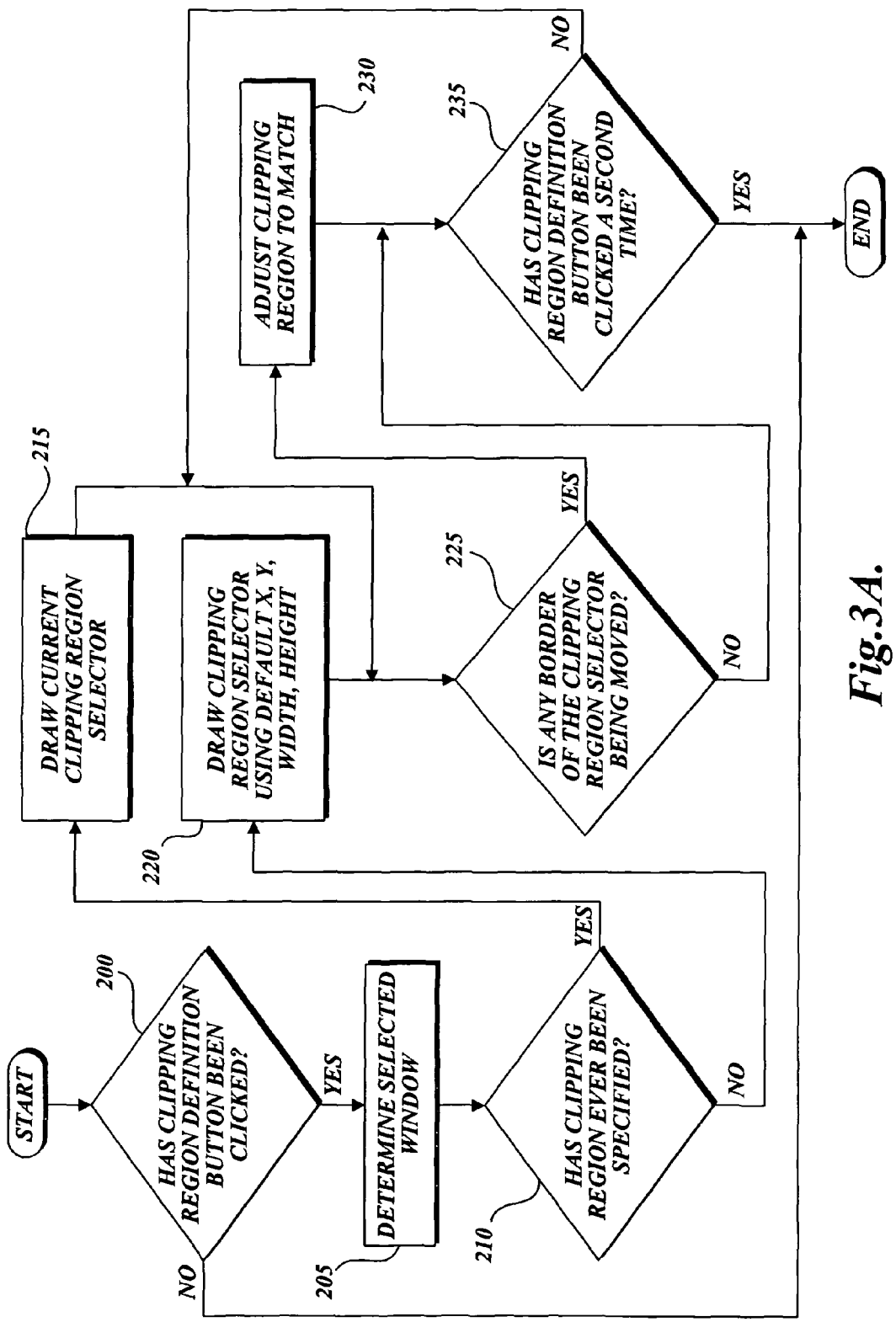
FIG. 3A is an exemplary functional flow diagram illustrating how an exemplary clipping region is formed.

An image, e.g., unchanging image 360, may be formed by the process illustrated by the exemplary functional flow diagram shown in FIG. 3A. The process describes how select dragging is used to select a rectangular area for clipping image, i.e., an image that is a region of a window, and used in a clipping. The process begins at block 200 in which a check is made to see if a clipping region, i.e., a clipping region that contains an image for a clipping, has been defined by a button click. If no clipping region has been defined by a clicked button, the process ends. If a clipping region has been defined by a clicked button, the control flows to block 205. At block 205 the selected window, e.g., a window containing an image such as unchanging image 360, is determined. At block 210 a check is made to see if a clipping region had ever been specified, i.e., was previously specified. If a clipping region has been previously specified, the control flows to block 215. If a clipping region has not been previously specified, the control flows to block 220. At block 215 the current clipping region selector, e.g., a rectangle with a dashed border, is drawn using the X and Y coordinates and width and height defined by select dragging action. At block 220 a clipping region selector is drawn using the default, i.e., predefined, X and Y coordinates and default width and height. At block 225 a check is made to see if the border of the clipping region selector is being moved. If no border of the clipping region selector is being moved, the control flows to block 235. If at least one border of the clipping region is being moved, the control flows to block 230. At block 230 the clipping region is adjusted to match the image region. At block 235 a check is made to see if the clipping region definition button has been clicked a second time. If the clipping region definition button has been clicked a second time, the process ends. If the clipping region definition button has not been clicked a second time, the control flows back to block 225.

Figure 5A:
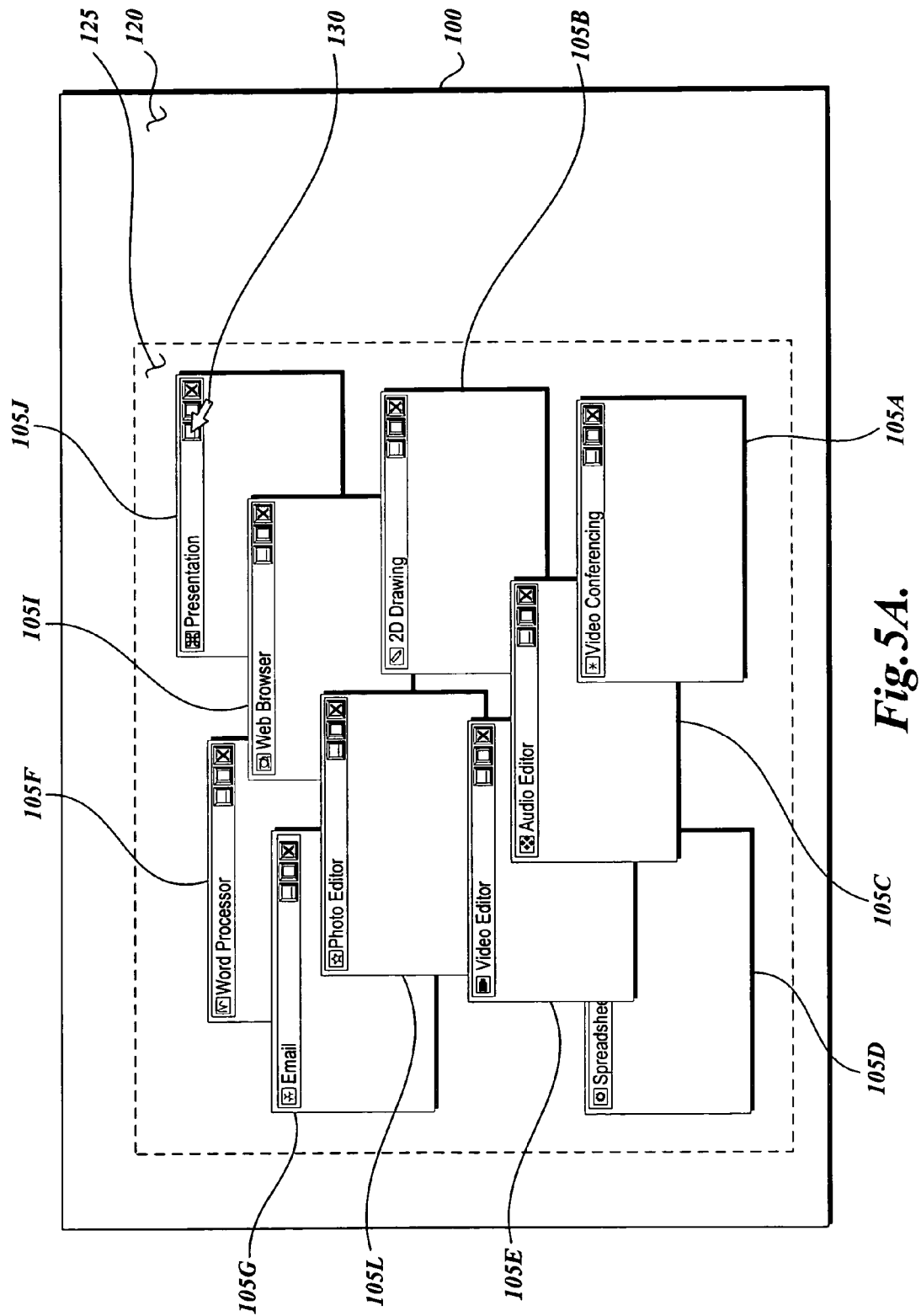
FIG. 5A is an illustration of an exemplary display with an exemplary peripheral region and an exemplary focal region containing a plurality of exemplary windows and a cursor positioned over the minimize button of a window.
Figure 5B:
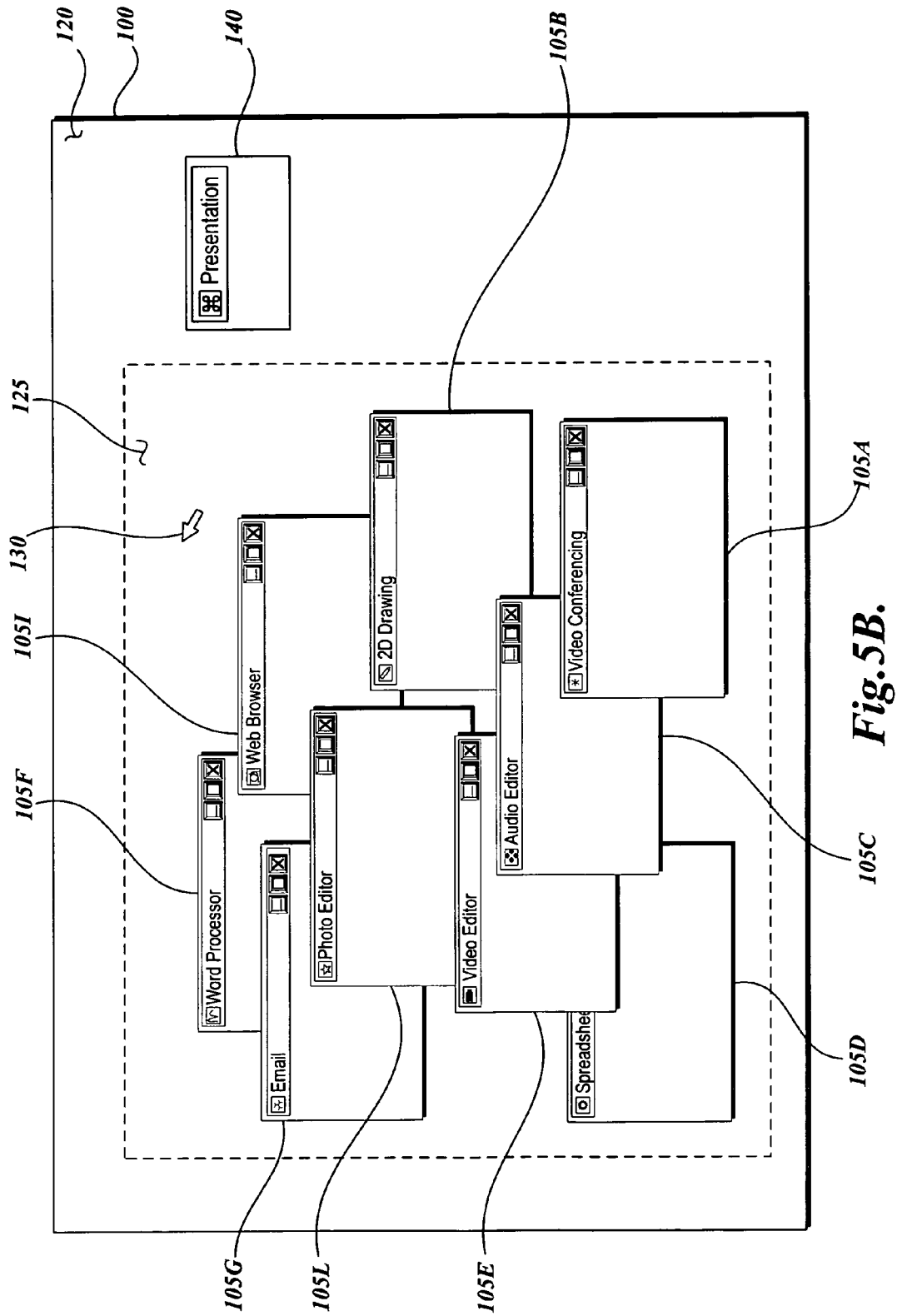
FIG. 5B is an illustration of the exemplary display shown in FIG. 5A with an exemplary clipping, in the peripheral region, for a window that is hidden.

Images for clippings may also be formed by selecting a predetermined region of the windows with which the clippings are associated. For example, a narrow rectangle encompassing the upper left corner of a window may be used to form "default" images for clippings. Using predetermined regions allows clippings to be formed by clicking on a control, e.g., the minimize button of a window. Forming clippings from predetermined window regions by clicking on the minimize button of a window is illustrated in FIGS. 5A and 5B. As in FIGS. 2A and 2B, in FIGS. 5A and 5B the display 100 is divided into a focal region 125 and peripheral region 120. The focal region contains the plurality of windows 105A, 105B, etc. One of the plurality of windows is the Presentation window 105J. The cursor 130 is placed over the minimize button of the Presentation window 105J. When the minimize button is clicked, the Presentation window 105J disappears (is hidden) and a clipping for Presentation window 105J appears in the peripheral region 120 at the same Y coordinate, i.e., height, as the Presentation window 105J. FIG. 5B illustrates the result of clicking the minimize button. More specifically, FIG. 5B illustrates the cursor 130 located in the focal region 125 at the original location of the minimize button of the Presentation window 105J. The Presentation clipping 140 is located in the peripheral region 120 at the Y coordinate of the Presentation window 105J. The X coordinate is a predetermined value used to vertically align clippings within the peripheral region 120.

It is also possible to provide more visual reinforcement to users when the minimize button of a window is clicked by animating the translation of a window in a focal region to a clipping in a peripheral region. For example, when the minimize button of a window in a focal region is clicked, instead of being immediately hidden, the window may be automatically moved from the focal region into the peripheral region in a manner that imitates a user's dragging motion. When the window crosses over into the peripheral region, the window is hidden and a clipping for the window appears in the peripheral region.

As just described, after a clipping image has been selected, the window from which the clipping image was derived is hidden and a clipping is formed in the peripheral region 120. How a clipping region that is derived from a region of a window is used to form a clipping, e.g., clipping 140, in the peripheral region 120 is illustrated by the exemplary functional flow diagram shown in FIG. 3B. For the process illustrated in FIG. 3B, a clipping can be considered to be an alternative "view" of a window. Thus, in the process illustrated in FIG. 3B, a window has a "window view" and a "clipping view." A window view is a window such as Presentation window 105J. A clipping view is a clipping such as clipping 140. The process begins at block 250 in which a check is made to see if the user is dragging a window, e.g., Presentation window 105J. If the user is dragging a window, the control flows to block 255. If the user is not dragging a window, the process ends. At block 255 a check is made to see if the window, e.g., Presentation window 105J, has passed from the focal region 125 to the peripheral region 120. If the window has passed from the focal region 125 to the peripheral region 120, the control flows to block 260. If the window has not passed from the focal region 125 to the peripheral region 120, the control flows to block 265. At block 260 the window is switched to the clipping view, i.e., the window view is hidden and the clipping view is shown. At block 265 a check is made to see if the window, possibly represented by a clipping view, has passed from the peripheral region 120 to the focal region 125. If the window has passed from the peripheral region 120 to the focal region 125, the control flows to block 270. If the window has not passed from the peripheral region 120 to the focal region 125, the control flows to block 275. At block 270 the window is switched to the window view, i.e., the window view is shown and the clipping view is hidden. At block 275 a check is made to see if the user has stopped dragging the window. If the user has stopped dragging the window, the control flows to block 280. If the user has not stopped dragging the window, the control flows back to block 255. At block 280 a check is made to see if the window is in the peripheral region 120. If the window is in the peripheral region 120, the control flows to block 285. If the window is not in the peripheral region 120, the control flows to block 290.

Clippings may be formed into clipping lists such as the clipping list having title block 180 with title Product Presentation shown in FIG. 6C comprising the Presentation clipping 140 and a 2D Drawing clipping 145 and described below. Continuing the process illustrated in FIG. 3B, at block 285 a check is made to see if the window is in a clipping list in the peripheral region 120, i.e., the location of the clipping view of the window is in the area that a clipping list occupies. If the window is not in a clipping list in the peripheral region 120, the control flows to block 290. If the window is in a clipping list in the peripheral region 120, the control flows to block 295. At block 290, the clipping location is set to the cursor location, i.e., the location coordinates of the clipping view are set to the location coordinates of the cursor. At block 295, the clipping, i.e., the clipping view of the window, is inserted at the end of the clipping list. At block 300, the clipping's X coordinate is set to a predetermined offset. At block 305, the clipping's Y coordinate is set so the clipping appears at the end of the clipping list. After block 305, the process ends.

Figure 3B:
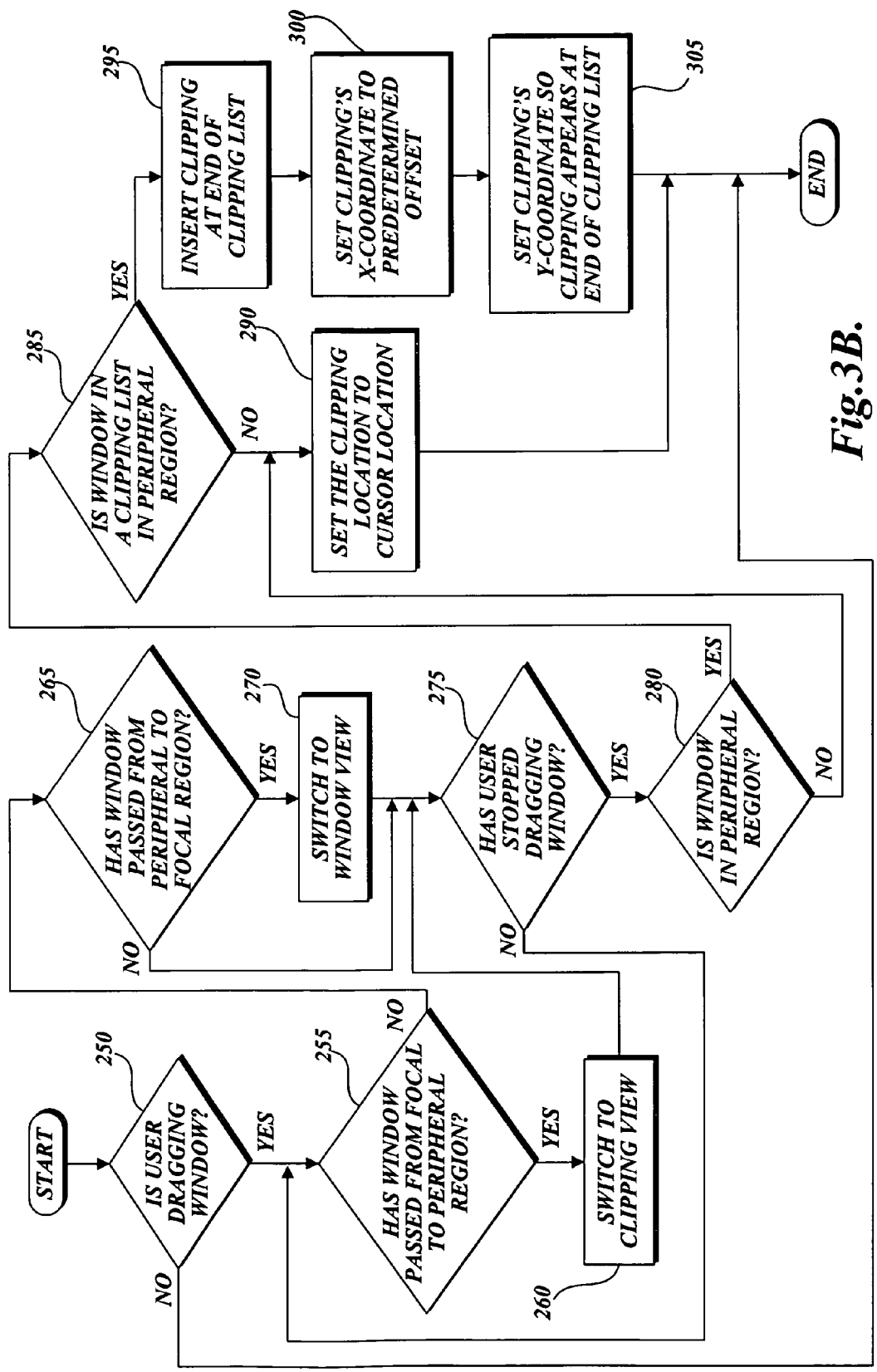
FIG. 3B is an exemplary functional flow diagram illustrating how an exemplary clipping is located in an exemplary peripheral region.
Figure 3C:
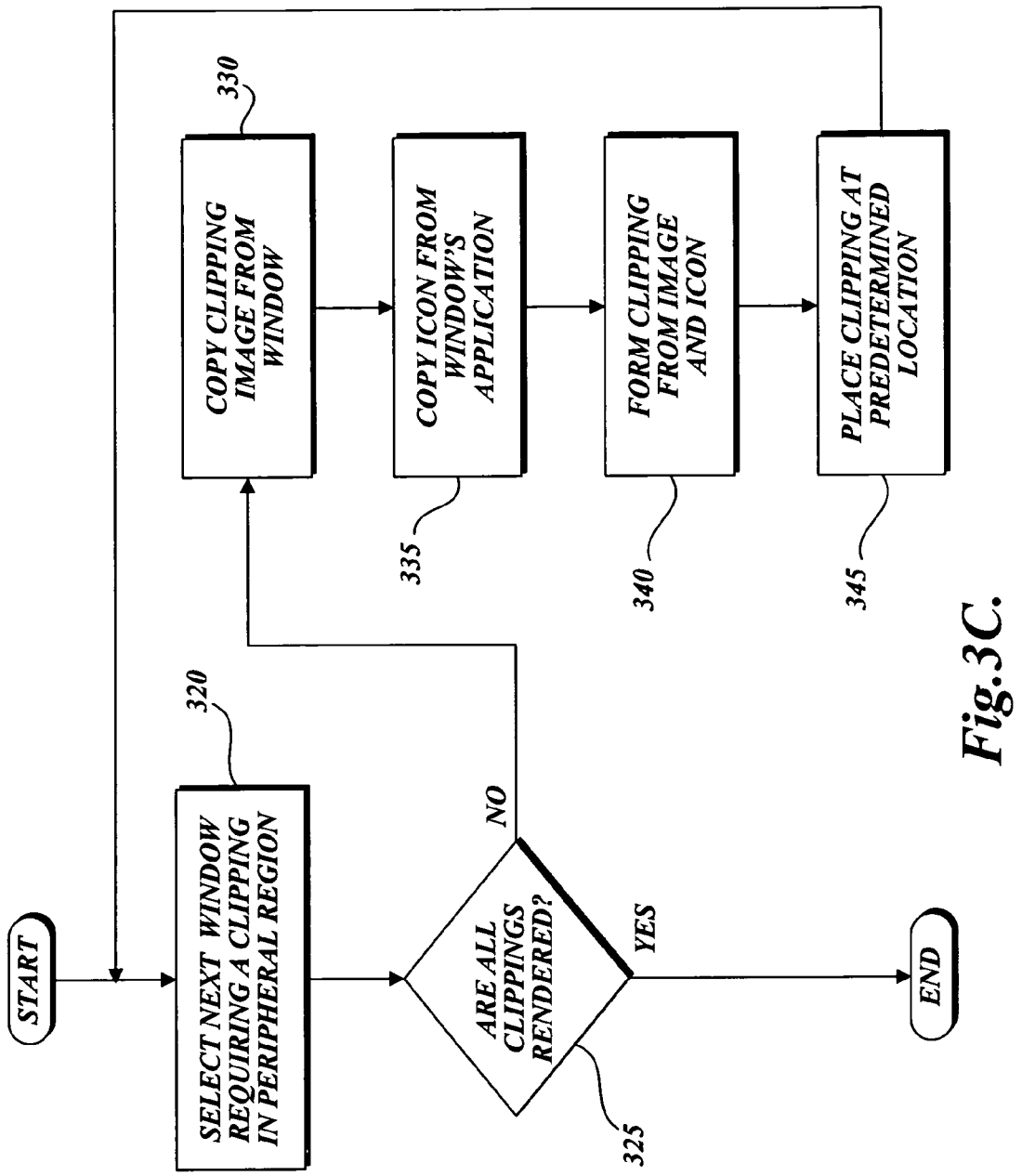
FIG. 3C is an exemplary functional flow diagram illustrating how exemplary clippings are rendered.

After clippings, i.e., clipping views of windows, have been formed and located in the peripheral region 120 using the process illustrated in FIG. 3B and described above, clippings are rendered in the peripheral region 120 using the process illustrated in FIG. 3C. At block 320, the next window requiring a clipping in the peripheral region 120 is selected. At block 325, a check is made to see if all clippings have been rendered. If all clippings have been rendered, the process ends. If all clippings have not been rendered, control flows to block 330. At block 330, a clipping image is copied from a window. At block 335, an icon representing the window's application, e.g., icon 350, is copied from the window's application, e.g., a Presentation application. At block 340, a clipping is formed from the image and the icon, e.g., Presentation clipping 140. At block 345, the clipping is placed at a predetermined location, i.e., the location determined during the process illustrated in FIG. 3B. Control flows back to block 320.

Figure 4B:
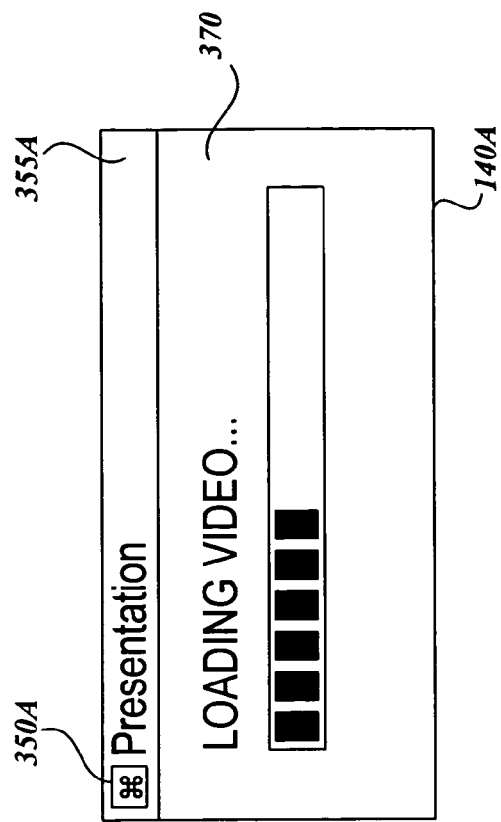
FIG. 4B is an illustration of an exemplary clipping with changing content.
Figure 4A:
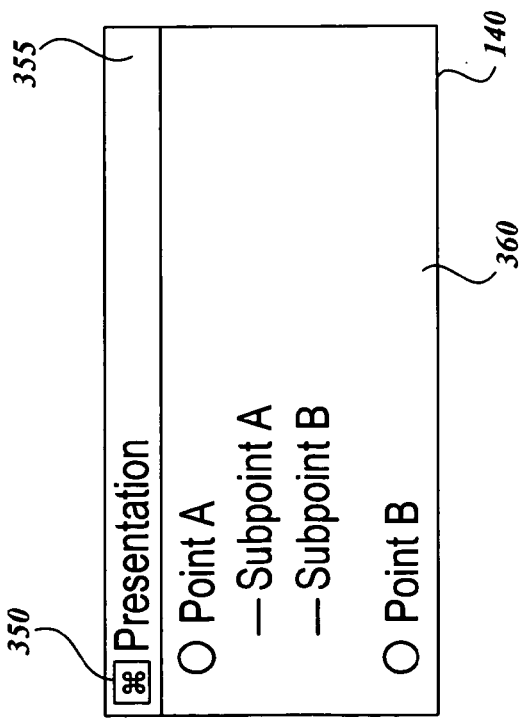
FIG. 4A is an illustration of an exemplary clipping with unchanging content.

Clippings, formed and located using the processes described above, contain images selected from the contents of the windows with which the clippings are associated. A property of clippings is the ability to reflect changes in the selected contents of the windows with which the clippings are associated. For example, a clipping for a Presentation application may contain a selected image of a progress bar that appears in a Presentation window. As the progress bar changes, the selected image of the progress bar in the clipping is updated to reflect the changes in the progress bar that appears in the Presentation window. Conversely, if the selected content of a window does not change, the selected image in the clipping does not change. An exemplary clipping associated with a window with unchanging content is shown in FIG. 4A. As noted above, exemplary Presentation clipping 140 comprises: a title bar 355, which contains the title Presentation; an icon 350 positioned to the left of the title; and, an unchanging image 360. The exemplary unchanging image 360 contains the text Point A followed by Subpoint A and Subpoint B which are followed by the text Point B. The unchanging image 360 in Presentation clipping 140 is derived from an unchanging region of the Presentation window 105J. Because the region in Presentation window 105J does not change, the unchanging image 360 does not change. An exemplary Presentation clipping 140 associated with a window region with changing content is illustrated in FIG. 4B. The Presentation clipping 140A comprises an icon 350A, a title bar 355A, and a changing image 370. The changing image 370 contains the text LOADING VIDEO . . . . The changing image 370 also contains a progress bar which consists of a long, thin, open rectangle containing a row of smaller black rectangles. In the window with which the Presentation clipping 140A is associated, i.e., the Presentation window 105J, as the loading of the video progresses, black rectangles are added to the end of the row of black rectangles. Adding black rectangles to the row of black rectangles changes the image in the region of the window occupied by the progress bar. Because the image in the region of the window occupied by the progress bar changes, the changing image 370 is updated periodically, e.g., every five seconds, to reflect the changes.

Figure 6B:
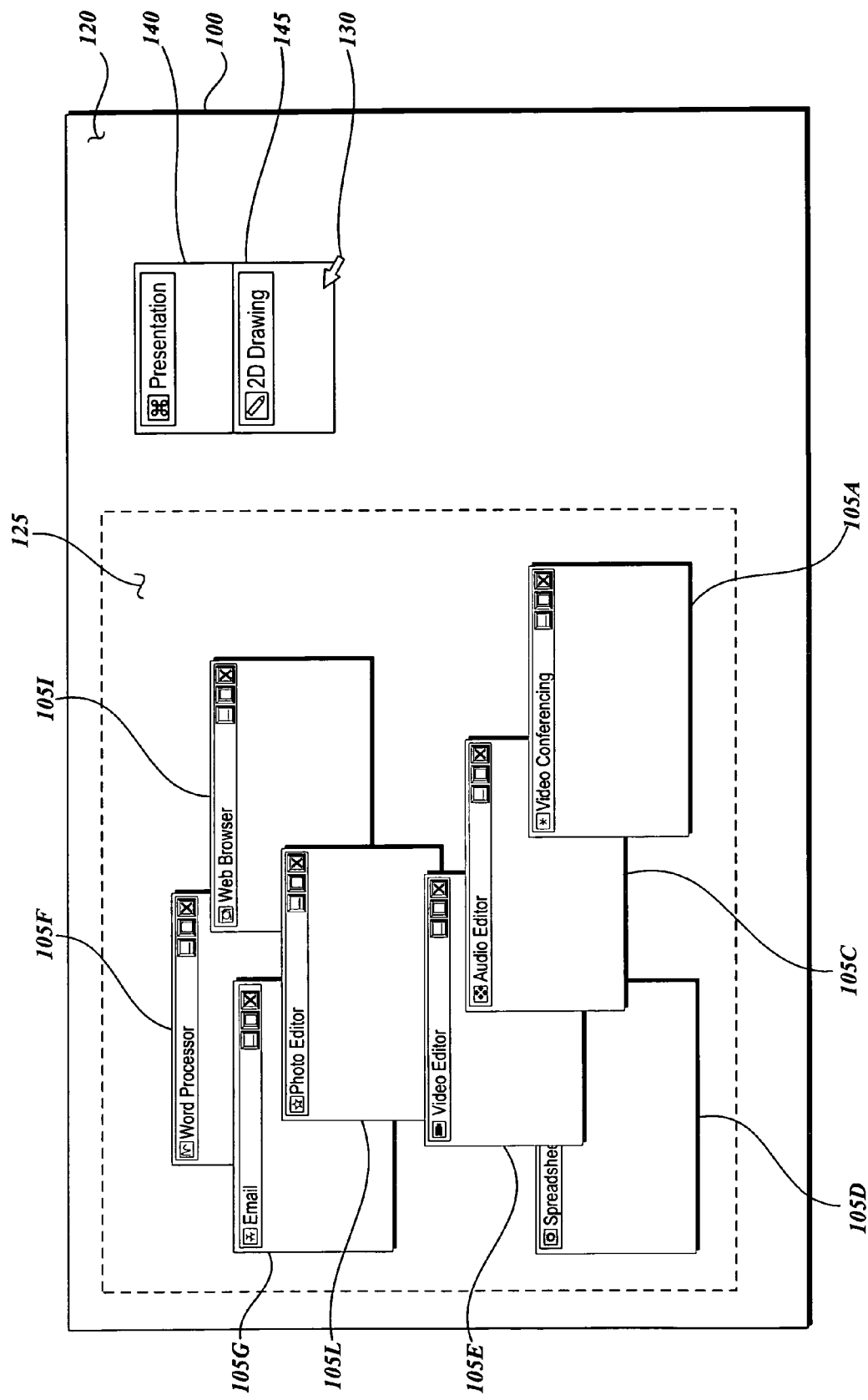
FIG. 6B is an illustration of the exemplary display shown in FIG. 6A with a second exemplary clipping in the peripheral region for a second exemplary hidden window.

Exemplary clipping lists, formed by the process illustrated by the functional flow diagram in FIG. 3B and described above, are shown in FIGS. 6A-6D. In FIG. 6A, as in other FIGURES, the display 100 is divided into the peripheral region 120 and focal region 125. The plurality of windows 105A, 105B, . . . 105I are shown in the focal region 125. The Presentation clipping 140 is located in the peripheral region 120. The Presentation window 105J is hidden. The cursor 130 is located over the Presentation clipping 140.

Like FIG. 6A, FIG. 6B shows the display 100 divided into the peripheral region 120 and the focal region 125. The focal region 125 contains the plurality of windows 105A, 105B, etc. A 2D Drawing clipping 145 is formed for the 2D Drawing window causing the 2D Drawing window to be hidden. The 2D Drawing clipping 145 is dragged near the Presentation clipping 140 causing a clipping list to be formed, as shown in FIG. 6C and described next. The cursor 130 remains over the 2D Drawing clipping 145 after the 2D Drawing clipping 145 is dragged. The 2D Drawing window 105B is missing from the focal region 125 since the 2D Drawing window 105B is now hidden.

Figure 6C:
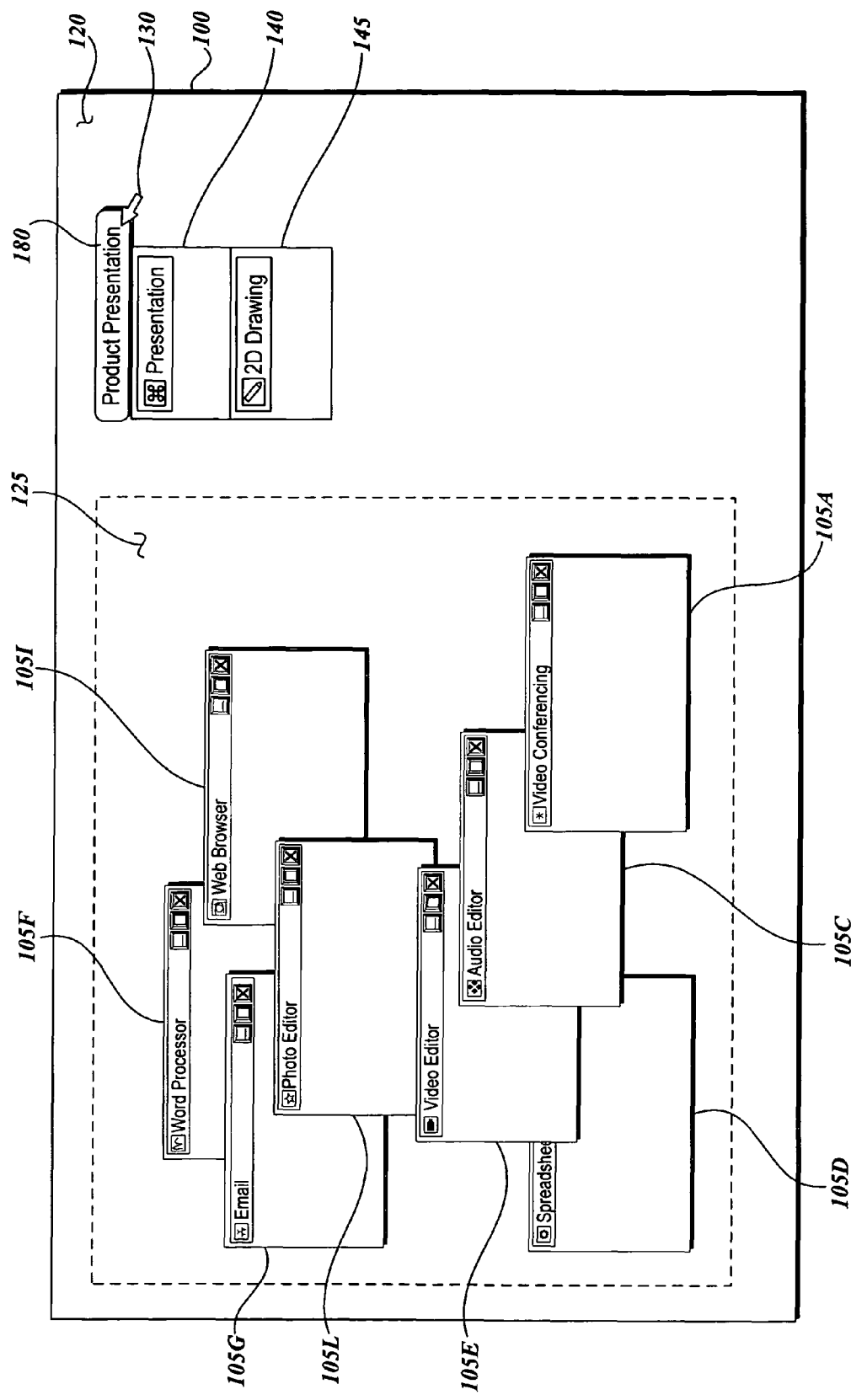
FIG. 6C is an illustration of the exemplary display shown in FIG. 6B with a clipping list formed from the first and second exemplary clippings in the peripheral region.

FIG. 6C illustrates the clipping list formed in FIGS. 6A and 6B. As in other FIGURES, the display 100 is divided into the peripheral region 120 and focal region 125. The plurality of windows 105A, 105B, . . . 105J are illustrated in the focal region. The clipping list formed from Presentation clipping 140 and 2D Drawing clipping 145 is the peripheral region 120. Above the clipping list is a title block 180 containing the title Product Presentation. The title refers to the task associated with the clippings in the clipping list and hence the windows associated with the clippings. The cursor 130 is shown located on the title block 180.

Figure 6D:
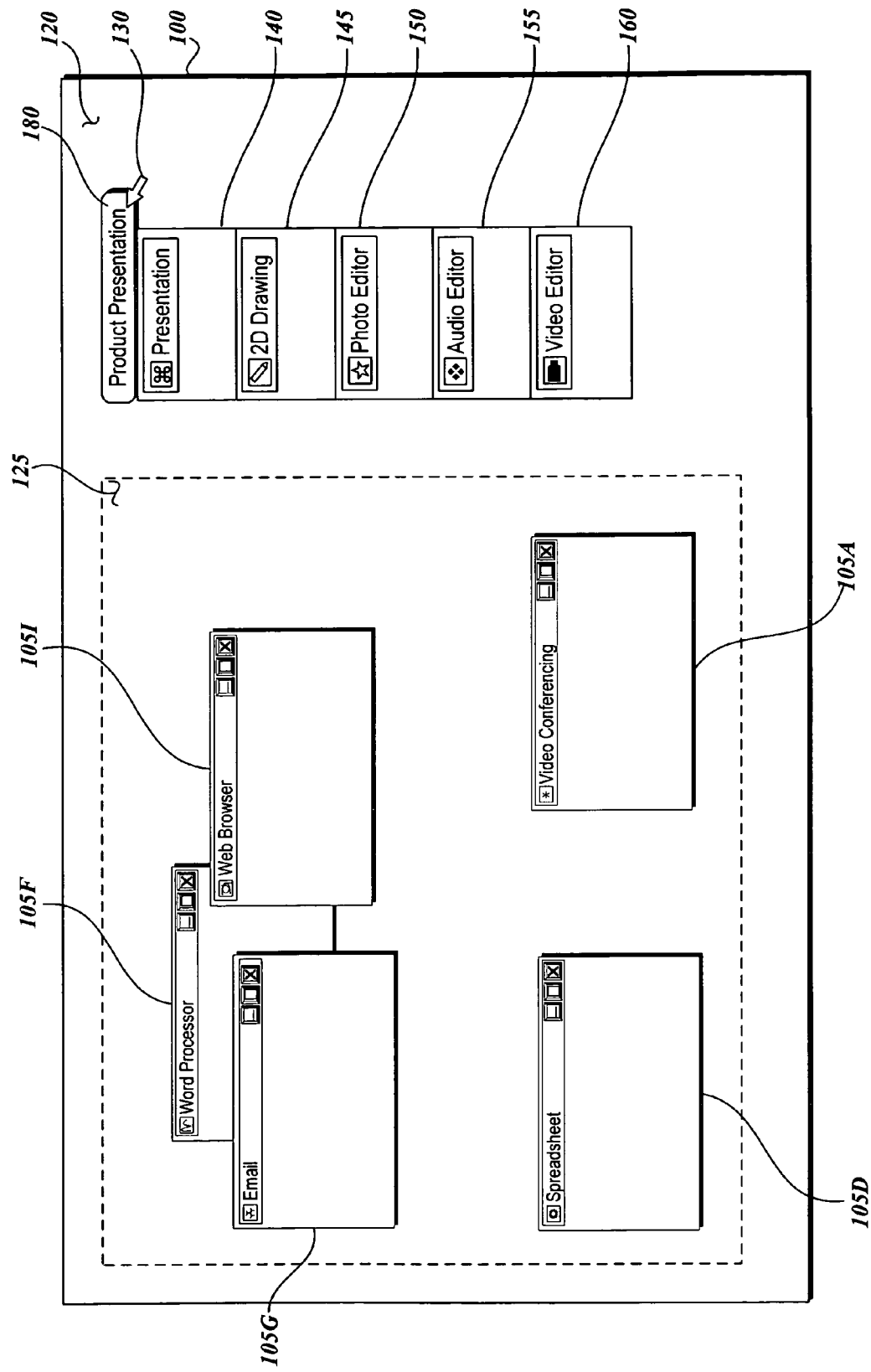
FIG. 6D is an illustration of the exemplary display shown in FIG. 6C with a clipping list containing five exemplary clippings in the peripheral region for five exemplary hidden windows.

FIG. 6D illustrates the clipping list associated with title block 180 expanded by the addition of three clippings. Again, the display 100 is divided into the peripheral region 120 and focal region 125. In the focal region 125 are the ones of the plurality of windows 105A, 105D, 105F, 105G, and 105I not having an associated clipping. The remaining windows of the plurality of windows 105 are hidden since these windows that have clippings in the clipping list in peripheral region 120. The clipping list in the peripheral region 120 has title block 180 containing the title Product Presentation. Beneath the title block 180 are the Presentation clipping 140, the 2D Drawing clipping 145, a Photo Editor clipping 150, an Audio Editor clipping 155, and a Video Editor clipping 160.

Figure 7:
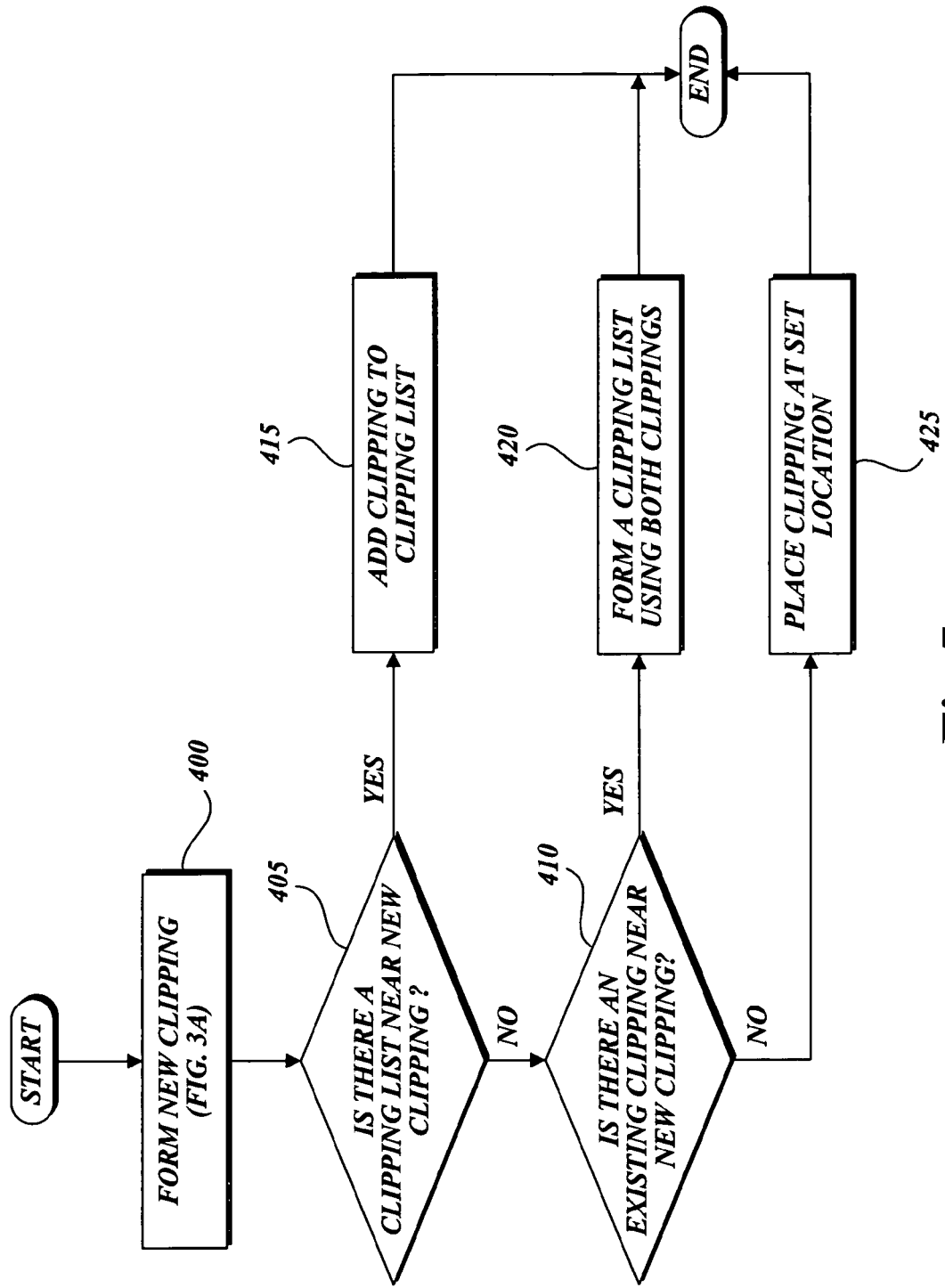
FIG. 7 is an exemplary functional flow diagram illustrating how clippings are added to form clipping lists.

How clippings are combined to form clipping lists is illustrated in FIG. 7. At block 400, a new clipping is formed using the process illustrated in FIG. 3A. At block 405, a check is made to see if there is a clipping list, such as the clipping list with title block 180, near the new clipping. If there is a clipping list near the new clipping, the control flows to block 415. At block 415, the clipping is added to the existing clipping list, e.g., the clipping list with title block 180. If there is not a clipping list near the new clipping, the control flows to block 410. At block 410, a check is made to see if there is an existing clipping near the new clipping. If there is an existing clipping near the new clipping, such as the Presentation clipping 140 and the 2D Drawing clipping 145, the control flows to block 420. At block 420, a clipping list is formed using both clippings, e.g., the Presentation clipping 140 and the 2D Drawing clipping 145. At block 425, the clipping is placed at the set location. After blocks 415, 420, and block 425, the process ends.

Figure 8:
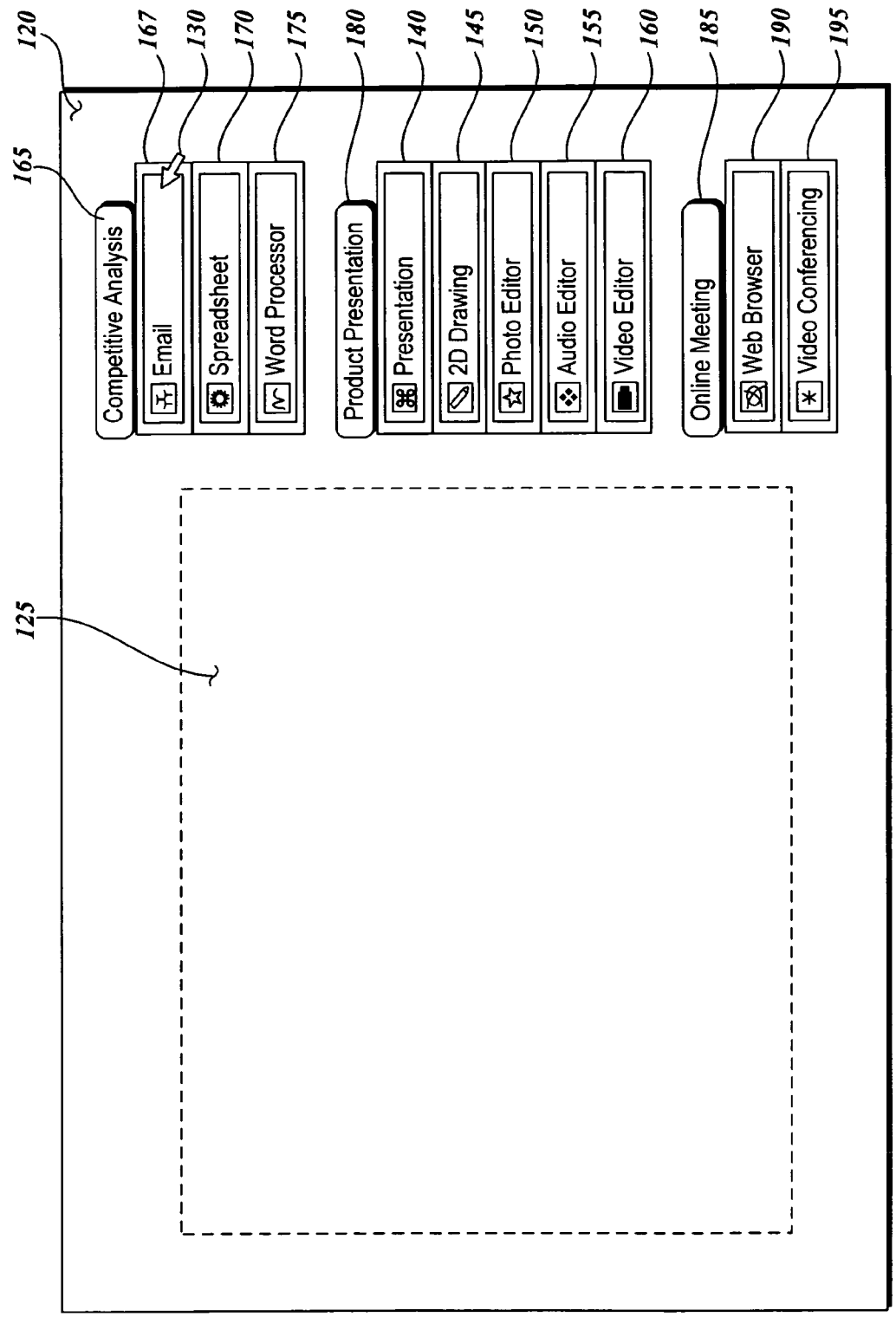
FIG. 8 is an illustration of an exemplary display with three exemplary clipping lists in the peripheral region and no windows appearing in the focal region.

It is possible to hide all of the windows in the plurality of windows 105A, 105B, etc., and form clippings and clipping lists for the windows. This possibility is shown in FIG. 8. More specifically, in FIG. 8, the focal region 125 is empty because all of the windows in the plurality of windows 105A, 105B, etc., are hidden. Clippings and clipping lists located in the peripheral region 120 have been formed for the windows. At the top of the peripheral region 120 is a title block 165 containing the title Competitive Analysis. Below the title block 165 is a clipping list comprising an E-Mail clipping 167, a Spreadsheet clipping 170, and a Word Processor clipping 175. The cursor 130 is shown located over the E-Mail clipping 195. Below the clipping list for title block 165 is a clipping list for the title block 180 containing the title Product Presentation. Below the title block 180 is a clipping list comprising the Presentation clipping 140, the 2D Drawing clipping 145, the Photo Editor clipping 150, the Audio Editor clipping 155, and the Video Editor clipping 160. Below the clipping list for title block 180 is a clipping list for the title block 185 containing the title Online Meeting. Below the title block 185 is a clipping list comprising a Web Browser clipping 190 and a Video Conferencing clipping 195.

Clippings may be used to replace the clutter of randomly placed windows with orderly clipping lists that are associated with tasks. Clippings organized by task allows users to better understand what tasks, and what windows for those tasks, are available. Often, a user must wait for certain computer processes to complete before proceeding with the work in a window. It is helpful to know when computer processes have completed in a window. A way to detect when a computer process in a window has completed is to monitor the contents of the window and detect when the contents of the window are changing and when the contents of the window have stopped changing.

Detecting when the contents of the window are changing and when the contents of the window have stopped changing may be accomplished by periodically comparing pixels in predetermined positions in the window contents to pixels in the same positions in the clipping contents. For example, a region of a window, which contains rows of pixels, is selected and copied to create a clipping image. The clipping image is placed in a clipping for the window. Periodically, pixels in the clipping image of the clipping are compared to pixels in the same positions in the original region of the window. If one or more pixels have changed, i.e., the color of the pixels have changed, the image has changed, i.e., is changing. If, after a predetermined number of periods, e.g., five periods, the pixels in the original region of the window have not changed relative to the pixels in the clipping image of the clipping, the image is determined to have ceased changing. To reduce the computational load, not all pixels need to be compared. For example, a set of every 64th pixel in a clipping image may be compared to the same set of pixels in an original window region.

Figure 9:
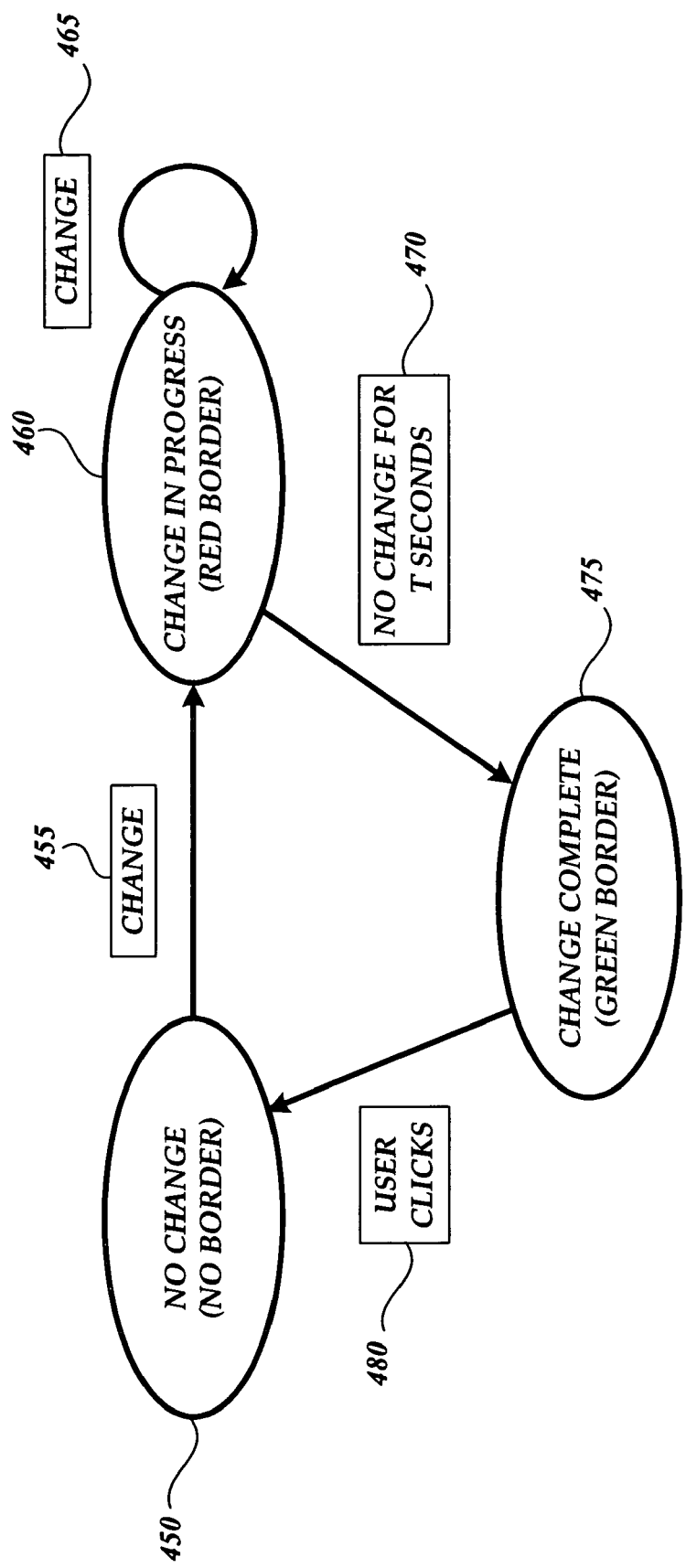
FIG. 9 is an exemplary state diagram illustrating the states and transition events for setting clipping and clipping list borders.
Figure 10B:
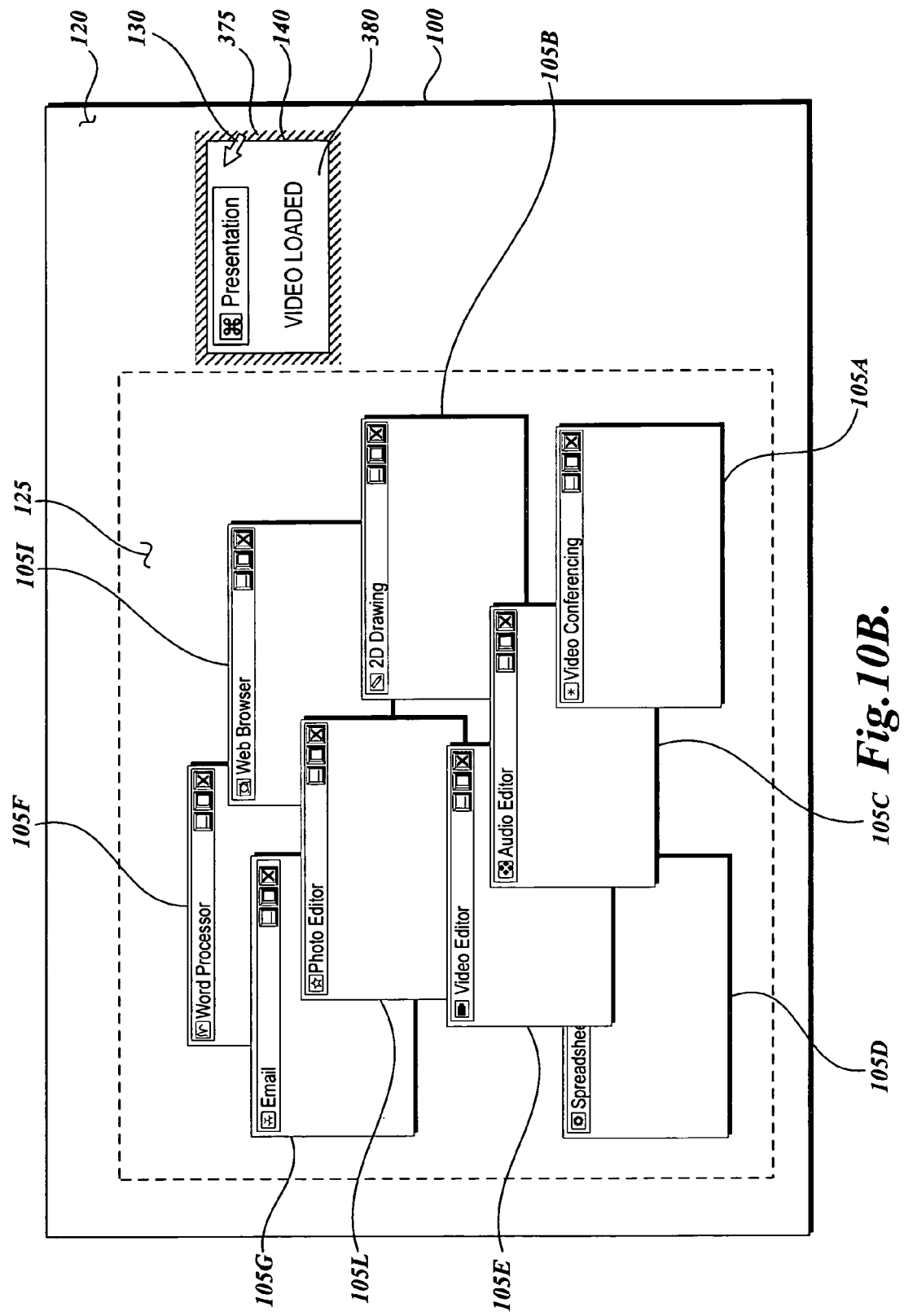
FIG. 10B is an illustration of the exemplary display shown in FIG. 10A with the exemplary clipping containing unchanging content and is surrounded by a "green" border.
Figure 10C:
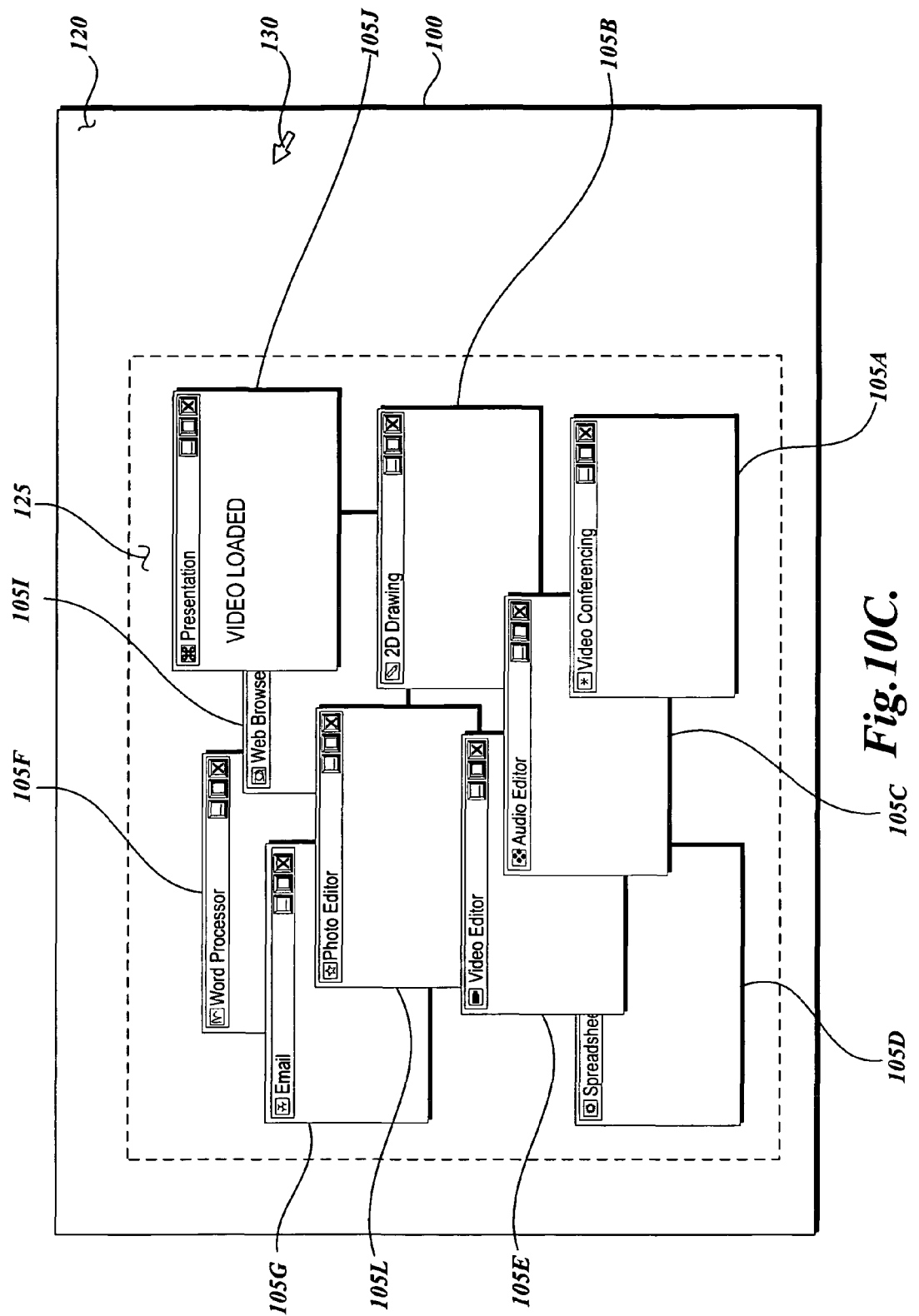
FIG. 10C is an illustration of the exemplary display shown in FIG. 10B with no clipping appearing in the peripheral region.

A way to signal the user when the contents of windows are changing and when the contents have stopped changing is to provide borders for the clippings associated with the windows. Changing the color of a clipping's border can be used to reflect the state of the window associated with the clipping. The colors of the borders that indicate the state of the clippings and clipping lists can be driven by a state machine. An exemplary state machine for indicating the state of the clippings and/or clipping lists is illustrated in FIG. 9. The state machine contains three states: No Change 450 (no border), Change In Progress state 460 (red border), and the Change Complete state 475 (green border). A change event 455 causes the state to switch from No Change state 450 to Change In Progress state 460. Continuous change events 465 cause the state Change In Progress to remain active. If, while in the Change In Progress state 460, there has been no change for a predetermined amount of time, i.e., T seconds 470, the state changes to the state Change Complete 475. While in the Change Complete state 475, if a user clicks 480, e.g., clicks a clipping or clipping list, the state changes to the No Change 450 state. FIGS. 10A-10C illustrate how the state machine is applied to a clipping.

FIG. 10A is an illustration of the display 100 with the peripheral region 120 and focal region 125. The focal region contains the plurality of windows 105A, 105B, etc. In the peripheral region 120 there is a Presentation clipping 140 surrounded by a border 395. In the Presentation clipping 140 is a changing image 370. Because the clipping image is a changing image, i.e., the changing image 370, a red border is applied to the clipping. Referring to the state machine shown in FIG. 9, a change event 455 causes the state to switch from the No Change state 450 to the Change In Progress state 460 which causes a red border to be applied to the clipping.

As in FIG. 10A, FIG. 10B illustrates the display 100 with the peripheral region 120 and the focal region 125 containing the plurality of windows 105A, 105B, . . . 105I. The peripheral region 120 contains the Presentation clipping 140. The Presentation clipping 140 contains an unchanging image 380. Because the clipping image is an unchanging image, i.e., includes the unchanging image 380, a green border 375A is applied to the clipping. Referring to the state machine shown in FIG. 9, while in the Change In Progress state 460, there has been no change for T seconds 470, the state changes to the state Change Complete 475 which causes a green border to be applied to an exemplary clipping.

FIG. 10C illustrates the display 100 with the peripheral region 120 and the focal region 125 containing the plurality of windows 105A, 105B, . . . 105J. Unlike FIGS. 10A and 10B, in FIG. 10C, the Presentation window 105J appears in the focal region 125. This is because a user has clicked on the Presentation clipping 140 causing the Presentation clipping 140 to be hidden and the Presentation window 105J to appear. Cursor 130 is shown located in the peripheral region 120 where the Presentation clipping 140 was located. Referring to the state machine shown in FIG. 9, while in the Change Complete state 475, if a user clicks a clipping, the state changes to the No Change 450 state which causes the Presentation clipping 140 to be hidden and the Presentation window 105J to appear.

Figure 11:
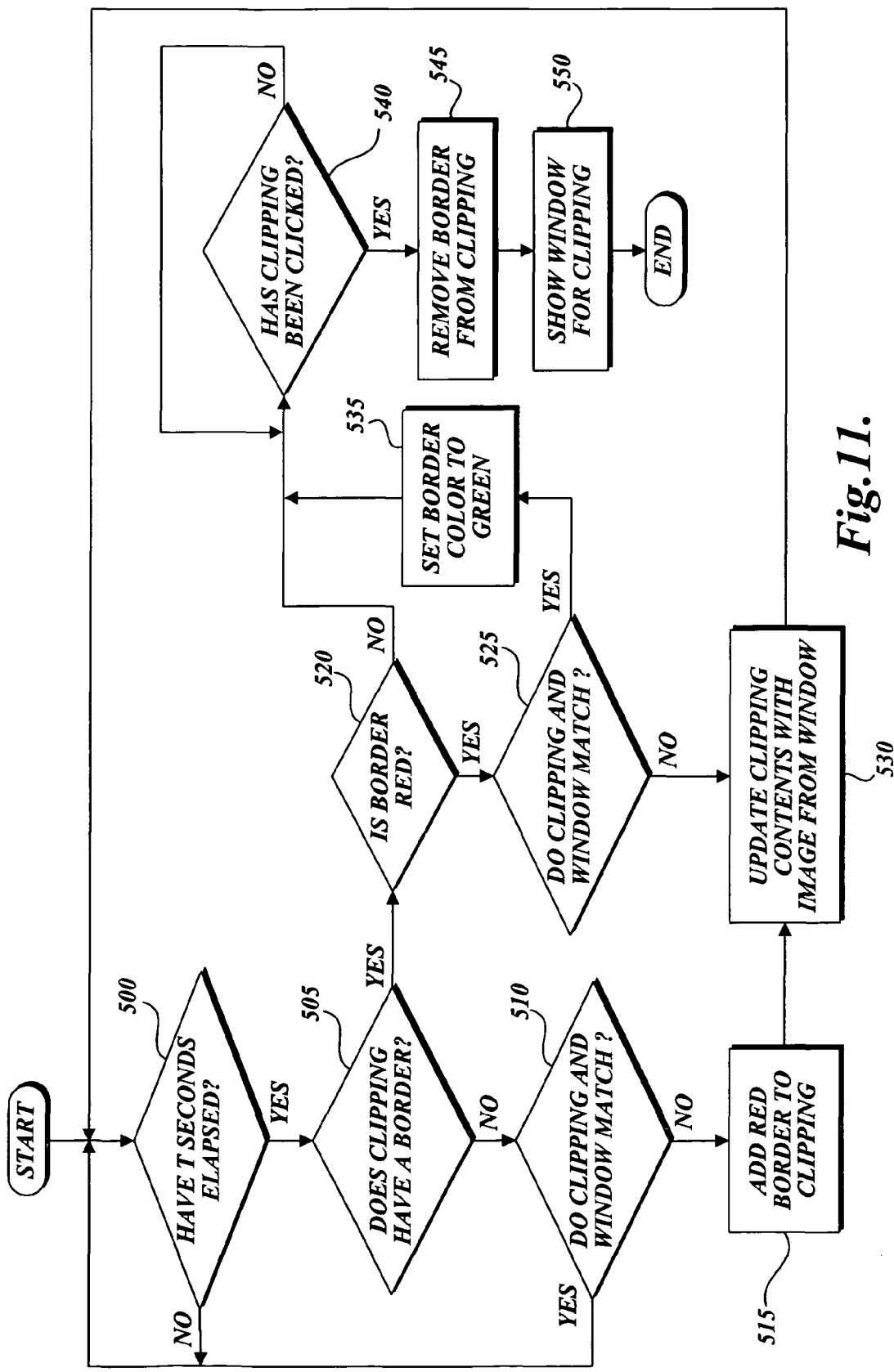
FIG. 11 is an exemplary functional flow diagram illustrating how borders are added to clippings.

FIG. 11 is a functional flow diagram showing how the borders are added to clippings. At block 500 a decision is made to see if a preset number of seconds, i.e., T seconds, have elapsed. If T seconds have not elapsed, the control flows back through block 500. If T seconds have elapsed, control flows to block 505. At block 505 a check is made to see if the clipping has a border. If the clipping has a border, the control flows to block 520. If the clipping does not have a border, the control flows to block 510. At block 510, a check is made to see if the clipping and window match. If the clipping and window images match, then the control flows back to block 500. If the clipping and window do not match, the control flows to block 515. At block 515, a red border is added around the clipping. At block 530, the clipping is updated with contents from the window. At block 520, a check is made to see if the border is red. If the border is not red, control flows to block 540. If the border is red, control flows to block 525. At block 525, a check is made to see if the clipping and window match. If the clipping and window match, the control flows to block 535. If the clipping and window do not match, the control flows to block 530. At block 530, the clipping is updated with contents from the image contents from the window. At block 535, the border is set to the color green. Control flows to block 540. At block 540, a check is made to see if the clipping itself has been clicked. If the clipping has not been clicked, then control flows back to block 540. If the clipping has been clicked, then control flows to block 545. At block 545, the border is removed from the clipping. At block 550, the window for the clipping is shown in the focal region. After block 550, the process ends.

Figure 12A:
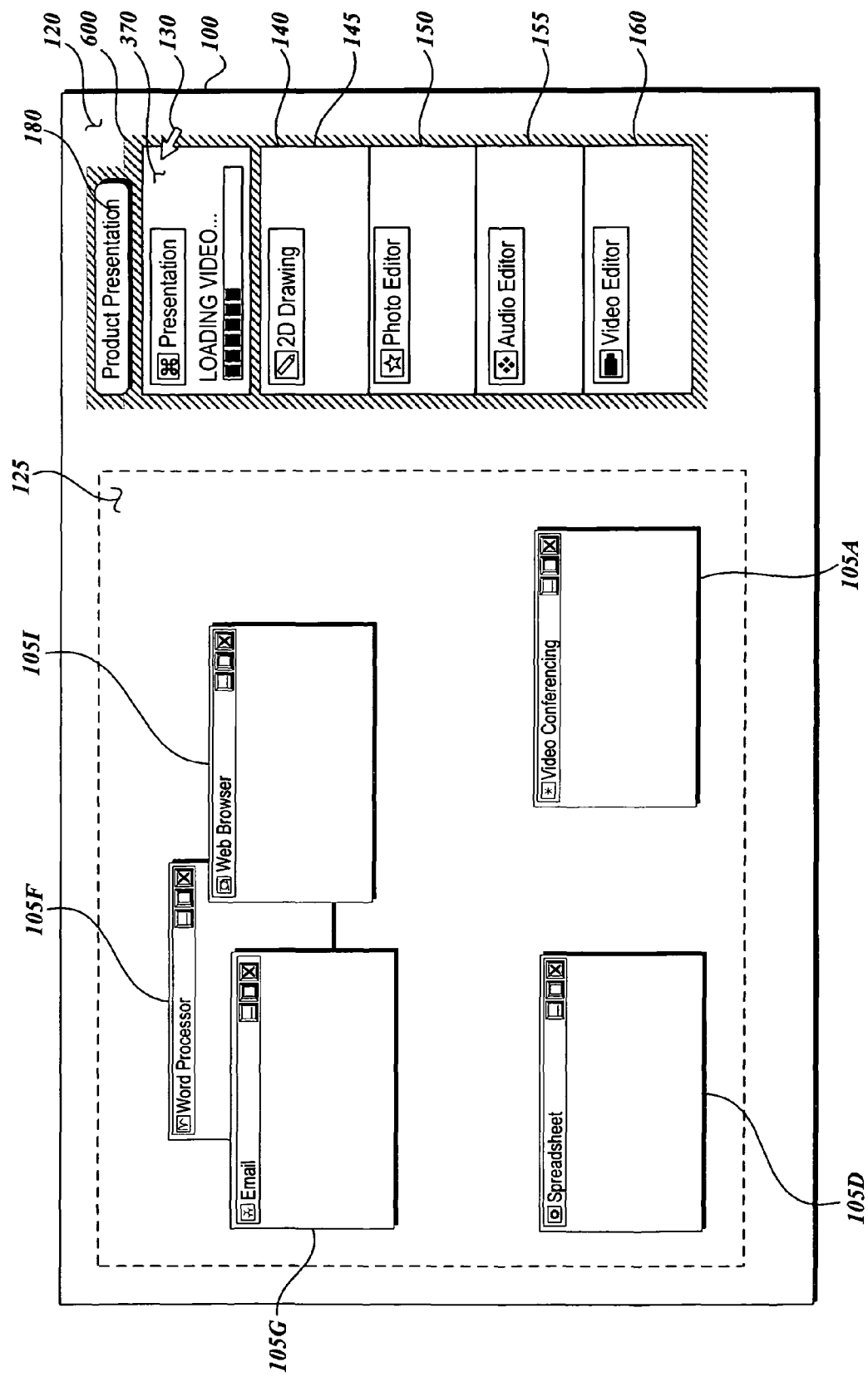
FIG. 12A is an illustration of an exemplary display with an exemplary clipping list, in the peripheral region, that contains changing content and is surrounded by a "red" border.
Figure 12B:
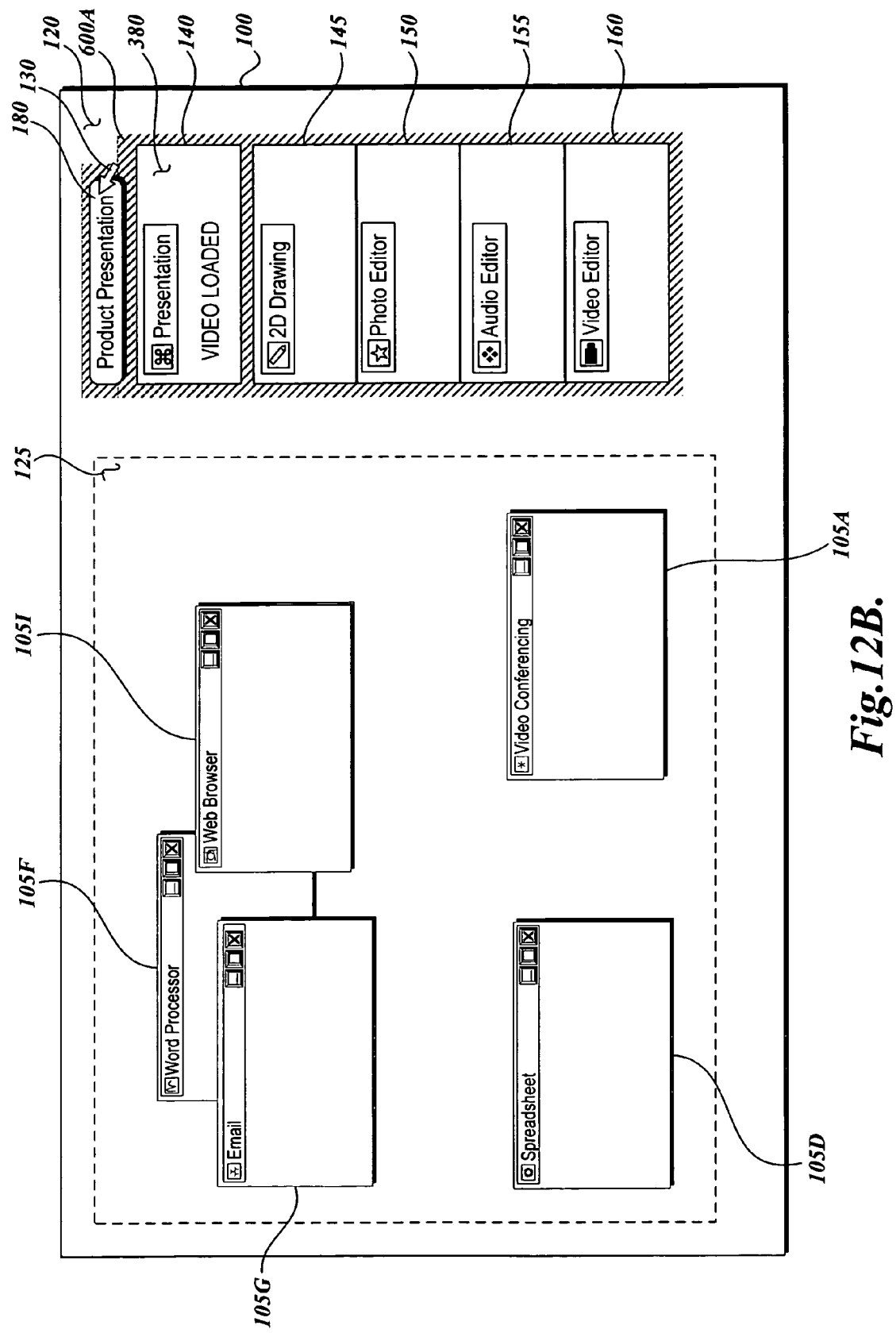
FIG. 12B is an illustration of the exemplary display shown in FIG. 12A with the exemplary clipping list containing unchanging content and surrounded by a "green" border.
Figure 12C:
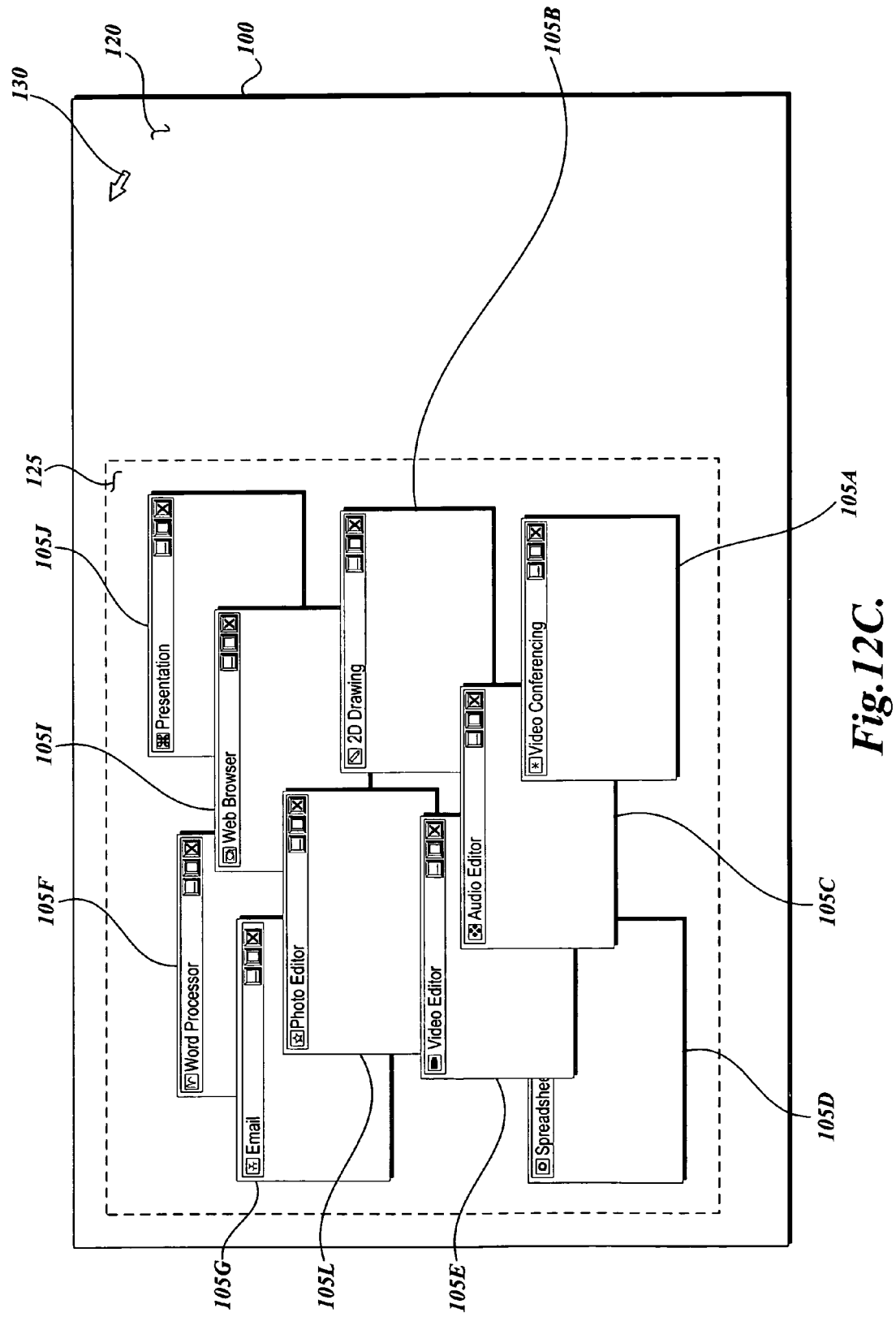
FIG. 12C is an illustration of the exemplary display shown in FIG. 12B with no clipping list appearing in the peripheral region.

The process illustrated in FIG. 11 and described above may also be applied to clipping lists. FIGS. 12A-12C illustrate how the process illustrated in FIG. 11 is applied to an exemplary clipping list.

FIG. 12A is an illustration of the display 100 with the peripheral region 120 and the focal region 125 containing the plurality of windows 105A, 105D, 105F, 105G, and 105I not having related clippings in the peripheral region. The clipping list associated with title block 180 is in the peripheral region 120. The clipping list associated with title block 180 comprises the Presentation clipping 140, the 2D Drawing clipping 145, the Photo Editor clipping 150, the Audio Editor clipping 155, and the Video Editor clipping 160. The Presentation clipping 140 contains the changing image 370. The cursor 130 is positioned over the Presentation clipping 140. Because the clipping image is a changing image, i.e., the changing image 370, a red border 600 is applied to the clipping and to the clipping list.

As in FIG. 12A, FIG. 12B illustrates the display 100 with the peripheral region 120 and focal region 125 containing the plurality of windows 105A, 105D, 105F, 105G, and 105I not having related clippings in the peripheral region. The clipping list associated with title block 180 is in the peripheral region 120. The clipping list associated with title block 180 comprises the Presentation clipping 140, the 2D Drawing clipping 145, the Photo Editor clipping 150, the Audio Editor clipping 155, and the Video Editor clipping 160. The Presentation clipping 140 contains image 380 which has not changed recently. Because of this, the color of the border around clipping 140 is changed to green. Because the clipping 140 border color has changed to green, the color of border 600A is changed to green.

FIG. 12C illustrates display 100 with the peripheral region 120 and the focal region 125 containing all of the plurality of windows 105A, 105B, . . . 105J. Unlike FIGS. 12A and 12B, in FIG. 12C, the clipping list associated with title block 180 is not in the peripheral region 125. This is because a user has clicked on the title block 180 causing the clipping list associated with title block 180 to be hidden and the windows associated with the clippings in the clipping list to appear. Cursor 130 is shown positioned in the peripheral region 120 located where the title block 180 was located. If, instead of clicking on title block 180, a user clicks on a clipping in the clipping list associated with title block 180, e.g., Presentation clipping 140, the clipping in the clipping list is hidden and the window associated with the clipping in the clipping list appears in the focal region.

Instead of using colored borders as a visual cue to indicate the state of clippings and clipping lists as illustrated in FIGS. 9-12C and described above, the state of clippings and clippings list may be indicated by using visual cues such as bolding the text of titles, providing color overlays or backgrounds for clippings and/or clipping lists, etc. Hence, using colored borders as a visual cue to indicate the state of clippings and clipping lists should be construed as exemplary and not limiting.

While illustrative embodiments have been illustrated and described, it will be appreciated that various changes can be made therein without departing from the spirit and scope of the invention. For example, while a process for forming clipping lists by moving one clipping near another clipping has been described above, it is also possible to form clipping lists by detecting similarities in the function and/or content of windows associated with clippings and forming clipping lists from clippings associated with windows of similar function and/or content.

The invention claimed is:

1. A method of managing windows displayed by a user interface of a computing device, the method comprising:
   forming a clipping for a selected window located within a focal region of a display of the user interface, the forming comprising:
   determining if a clipping definition button has been clicked, and if so, then determining a selected window;
   determining if a clipping for the selected window has previously been specified;
   if so, then drawing previously specified clipping, if not, then drawing a default clipping using default width and height;
   determining if any border of a clipping region selector is moved;
   adjusting the clipping to match the movement of the clipping region selector; and
   repeating the adjusting until the clipping definition button has been clicked a second time, to thereby allow a user to form the clipping for the selected window according to a preference of the user;
   determining if the user is dragging a window;
   if the user is dragging a window, then determining if the window has passed from a focal region to a peripheral region on the display of the user interface;
   if the window has passed from the focal region to the peripheral region, then switching the window to the clipping;
   if the window has not passed from the focal region to the peripheral region, then determining if the window has passed from the peripheral region to the focal region, and if so then switching the window to a window view;
   determining if the user has stopped dragging the window, and if so, determining if the window is in the peripheral region, and if not, continuing to determine if a window has passed between the focal region and the peripheral region;
   determining if the window is in a clipping list in the peripheral region, and if so, then: inserting the clipping of the window at an end of the clipping list;

setting an X-coordinate of the clipping to a predetermined offset; and setting a Y-coordinate of the clipping to locate the clipping at end of clipping list; and if not, then: positioning the clipping at a location of a cursor;

determining if change has been made to the window selected by operation of the clipping region definition button by comparing pixels in selected positions in the selected window to pixels in related positions in the clipping;

responding to change made to the selected window by replacing clipping contents with selected window contents;

indicating change to the selected window by an appearance of the clipping, such that no change to the selected window is indicated by no borders on the clipping, a change in the selected window that is in progress is indicated by red borders on the clipping, and a completed change to the selected window is indicated by green borders on the clipping;

changing the red borders indicating change in progress to green borders indicating completed change in response to passage of a set time;

changing the green borders indicating change in progress to no borders indicating no change in response to a user click;

indicating a change state of the clipping in response to change in the selected window; and propagating the change state of the clipping to the clipping list.

* * * * *